(12) United States Patent
Moon

(10) Patent No.: US 10,664,235 B2
(45) Date of Patent: May 26, 2020

(54) APPARATUS AND METHOD FOR SORTING ITEMS USING LONGEST INCREASING SUBSEQUENCE

(71) Applicant: SK PLANET CO., LTD., Seongnam-si, Gyeonggi-do (KR)

(72) Inventor: Dong-Sun Moon, Seongnam-si (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 242 days.

(21) Appl. No.: 14/898,441

(22) PCT Filed: Nov. 3, 2014

(86) PCT No.: PCT/KR2014/010406
§ 371 (c)(1),
(2) Date: Nov. 11, 2016

(87) PCT Pub. No.: WO2015/182833
PCT Pub. Date: Dec. 3, 2015

(65) Prior Publication Data
US 2017/0068515 A1    Mar. 9, 2017

(30) Foreign Application Priority Data

May 27, 2014  (KR) .................. 10-2014-0063585
May 27, 2014  (KR) .................. 10-2014-0063586
May 27, 2014  (KR) .................. 10-2014-0063587

(51) Int. Cl.
*G06F 7/08* (2006.01)
*G06F 7/24* (2006.01)
(Continued)

(52) U.S. Cl.
CPC .............. *G06F 7/08* (2013.01); *G06F 7/24* (2013.01); *G06F 16/22* (2019.01); *G06F 16/23* (2019.01); *G06F 16/285* (2019.01)

(58) Field of Classification Search
CPC .................................. G06F 7/08; G06F 16/22
(Continued)

(56) References Cited

U.S. PATENT DOCUMENTS 5,179,699 A * 1/1993 Iyer ........................ G06F 7/36
7,017,118 B1 * 3/2006 Carroll ................ G06F 3/0481
345/160

(Continued)

FOREIGN PATENT DOCUMENTS

KR    1020010025387 A    4/2001
KR    1020090094866 A    9/2009
(Continued)

OTHER PUBLICATIONS

Gopalan, Parikshit, et al. "Estimating the sortedness of a data stream." Proceedings of the eighteenth annual ACM-SIAM symposium on Discrete algorithms. Society for Industrial and Applied Mathematics, 2007. (Year: 2007).*
(Continued)

*Primary Examiner* — Mohsen Almani
(74) *Attorney, Agent, or Firm* — Fenwick & West LLP

(57) ABSTRACT

An apparatus and method for sorting items using a longest increasing subsequence are disclosed. Item sorting may be performed by selecting excluded items, which correspond to a longest increasing subsequence, from among items in an item list, selecting update items by excluding the excluded items from the items, and performing update for the update items. It is possible to more efficiently use a system by selecting items to be updated from among various items in an item list and updating them to reduce the system workload for updating the items.

12 Claims, 9 Drawing Sheets

| ITEM | PRIMARY INDEX | AUXILIARY INDEX |
|---|---|---|
| A | 1 | 0 |
| E | 2 | -2 |
| D | 2 | -1 |
| B | 2 | 0 |
| C | 3 | 0 |

→ 920

| ITEM | PRIMARY INDEX | AUXILIARY INDEX 1 | AUXILIARY INDEX 2 |
|---|---|---|---|
| A | 1 | 0 | 0 |
| E | 2 | -2 | 0 |
| C | 2 | -1 | -1 |
| D | 2 | -1 | 0 |
| B | 2 | 0 | 0 |

(51) Int. Cl.
*G06F 16/22* (2019.01)
*G06F 16/23* (2019.01)
*G06F 16/28* (2019.01)

(58) Field of Classification Search
USPC .......................................................... 707/737
See application file for complete search history.

(56) References Cited

U.S. PATENT DOCUMENTS

| | | | | |
|---|---|---|---|---|
| 7,130,851 | B1* | 10/2006 | Brown | G06F 7/24 |
| 7,197,498 | B2* | 3/2007 | Perloff | G06F 7/24 |
| | | | | 707/748 |
| 2005/0021572 | A1* | 1/2005 | Ren | G06F 8/658 |
| 2005/0198023 | A1 | 9/2005 | James et al. | |
| 2008/0313049 | A1* | 12/2008 | Lai | G06Q 10/087 |
| | | | | 705/27.1 |
| 2009/0063485 | A1* | 3/2009 | Schneider | G06F 7/026 |
| 2011/0131170 | A1* | 6/2011 | Golab | G06N 5/00 |
| | | | | 706/54 |
| 2012/0233144 | A1 | 9/2012 | Rosario et al. | |
| 2012/0331171 | A1 | 12/2012 | Aschen et al. | |
| 2013/0297675 | A1* | 11/2013 | Li | G09B 7/02 |
| | | | | 709/203 |
| 2014/0244653 | A1* | 8/2014 | Plotkin | G06Q 10/06311 |
| | | | | 707/741 |

FOREIGN PATENT DOCUMENTS

| | | |
|---|---|---|
| KR | 1020100038800 A | 4/2010 |
| WO | 0169432 A2 | 9/2001 |

OTHER PUBLICATIONS

Wikipedia, "Longest increasing subsequences"; https://en.wikipedia.org/wiki/Longest_increasing_subsequence; retrieved Mar. 11, 2019 (Year: 2019).*

Bespamyatnikh, Sergei, and Michael Segal. "Enumerating longest increasing subsequences and patience sorting." Information Processing Letters 76.1-2 (2000): 7-11. (Year: 2000).*

Heath, Lenwood S., and John Paul C. Vergara. "Sorting by bounded block-moves." Discrete Applied Mathematics 88.1-3 (1998): 181-206. (Year: 1998).*

Gopalan, Parikshit, et al. "Estimating the sortedness of a data stream." SODA. vol. 7. 2007. (Year: 2007).*

Cook, Curtis R., and Do Jin Kim. "Best sorting algorithm for nearly sorted lists." Communications of the ACM 23.11 (1980): 620-624. (Year: 1980).*

Semba, I. C. H. I. R. O. "On generating and counting all the longest increasing subsequences." J. Inform. Proc. vol. 7. 1984. (Year: 1984).*

International Search Report dated Jan. 30, 2015 for PCT/KR2014/010406.

* cited by examiner

| | |
|---|---|
| 1 | FROZEN |
| 2 | SNOWPIECER |
| 3 | FROZEN (DUBBED) |
| 4 | TABLOID TRUTH |
| 5 | WHEN A MAN LOVES |
| 6 | HUNGER GAME |
| 7 | THE AVENGERS |
| 8 | THE ATTORNEY |
| 9 | BLOOD BOILING YOUTH |
| 10 | THE FIRST AVENGER |

| | |
|---|---|
| 1 | THE FIRST AVENGER |
| 2 | FROZEN |
| 3 | SNOWPIECER |
| 4 | FROZEN (DUBBED) |
| 5 | TABLOID TRUTH |
| 6 | WHEN A MAN LOVES |
| 7 | HUNGER GAME |
| 8 | THE AVENGERS |
| 9 | THE ATTORNEY |
| 10 | BLOOD BOILING YOUTH |

| ITEM | PRIMARY INDEX | AUXILIARY INDEX |
|---|---|---|
| A | 1 | 0 |
| B | 2 | 0 |
| C | 3 | 0 |
| D | 4 | 0 |
| E | 5 | 0 |

820

| ITEM | PRIMARY INDEX | AUXILIARY INDEX |
|---|---|---|
| A | 1 | 0 |
| E | 2 | -1 |
| B | 2 | 0 |
| C | 3 | 0 |
| D | 4 | 0 |

| ITEM | PRIMARY INDEX | AUXILIARY INDEX |
|---|---|---|
| A | 1 | 0 |
| E | 2 | -2 |
| D | 2 | -1 |
| B | 2 | 0 |
| C | 3 | 0 |

920

| ITEM | PRIMARY INDEX | AUXILIARY INDEX 1 | AUXILIARY INDEX 2 |
|---|---|---|---|
| A | 1 | 0 | 0 |
| E | 2 | -2 | 0 |
| C | 2 | -1 | -1 |
| D | 2 | -1 | 0 |
| B | 2 | 0 | 0 |

FIG. 9

APPARATUS AND METHOD FOR SORTING ITEMS USING LONGEST INCREASING SUBSEQUENCE

TECHNICAL FIELD

The present invention generally relates to an apparatus and method for sorting items using a longest increasing subsequence, and more particularly, to an apparatus and method for sorting items using a longest increasing subsequence, which is capable of efficiently updating item information and sorting an item list in a database.

This application claims priority from Korean Patent Application Nos. 10-2014-0063585, filed on May 27, 2014, 10-2014-0063586, filed on May 27, 2014, and 10-2014-0063587, filed on May 27, 2014, in the Korean Patent and Trademark Office. Further, this application is the PCT U.S. National Phase entry of International Application No. PCT/KR2014/010406 filed on Nov. 3, 2014, the entire contents of which are hereby incorporated by reference.

BACKGROUND ART

With the rapid growth in the fields of smartphones and tablet PCs, mobile app stores, which provide various mobile contents and service, are rapidly growing. These mobile stores provide numerous and diverse items for use on mobile terminals. Accordingly, in order to more conveniently provide items to users, the items are classified according to the content of the item, the type of user terminal, and whether an additional fee must be paid in order to use the mobile item. In addition, for item classification, exposure rankings of the items in an item list are determined and frequently updated according to the popularity or recency thereof.

According, an app store server, which provides many mobile items, is required to update the exposure rankings of items, which are frequently changed, and to store and manage them in a database. Since this task may impose a large load on systems, it is disadvantageous to such systems. Nevertheless, it is very burdensome for a service provider to reduce the number of mobile items in consideration of system load or to incur enormous expenses for system expansion in order to improve performance.

As a related art, Korean Patent Laid-open Application Publication No. 10-2001-0025387, filed Apr. 6, 2001, discloses "System and method for measuring ranking using internet".

DISCLOSURE

Technical Problem

The present invention has been proposed to select only items to be updated from among various items included in an item list, which is provided by a mobile app store or the like, and to perform update to allow a system to be efficiently used by remarkably reducing the system workload incurred by the update.

The present invention has also been proposed to reduce the system workload incurred by item update by searching to provide a value of case where the update workload is reduce to a minimum when multiple items are updated at one time using multiple sorting indexes.

Technical Solution

In accordance with an aspect of the present invention to accomplish the above object, there is provided an item sorting method including: selecting excluded items, which correspond to a longest increasing subsequence, from among items in an item list; selecting update items by excluding the excluded items from the items; and performing item sorting on the items by performing update for the update items, wherein the update is performed using multiple sorting indexes which correspond to the update items, and the item sorting is performed using the multiple sorting indexes.

The item sorting method may further include: generating item groups by grouping adjacent items among the items in the item list; selecting excluded groups, which correspond to the longest increasing subsequence, from among the item groups; and selecting update groups by excluding the excluded groups from the item groups, wherein performing item sorting includes performing update on the update groups to perform item sorting on the items.

Generating item groups may include grouping items having an increase in update order of 1 therebetween among the items in the item list.

The update may be performed on one or more of the update items and items corresponding to the update groups, and may not be performed on the excluded items and items corresponding to the excluded groups.

Selecting excluded items may include selecting, as the excluded items, items of which update orders are included in the longest increasing subsequence from among the items, and selecting excluded groups includes finding the longest increasing subsequence using startup orders respectively corresponding to the item groups, and selecting, as the excluded groups, item groups corresponding to the startup orders included in the longest increasing subsequence.

Selecting excluded groups may include, when the longest increasing subsequence is two or more in number, selecting the excluded groups in consideration of group sizes of the item groups corresponding to the startup orders included in the longest increasing subsequences.

The update order may be changed according to the item sorting.

Performing item sorting may include performing the item sorting by using an auxiliary index of the multiple sorting indexes on items of which primary indexes of the multiple sorting indexes are identical among the items.

Performing item sorting may include updating the update items in consideration of the multiple sorting indexes of items of which update orders have a difference of 1 from the update items among the items.

Performing item sorting may include updating the update items by changing an auxiliary index of any one of the items of which update orders have a difference of 1 from the update items among the items, when the primary indexes of the items, of which the update orders have a difference of 1 from the update items, are identical.

Performing item sorting may include updating the update items in consideration of the number of items of which the primary indexes are identical to those of items of which update orders have a difference of 1 from the update items.

In accordance with another aspect of the present invention to accomplish the above object, there is provided an item sorting apparatus including: an item list receiving unit, which receives an item list from a server; an item updating unit, which performs update on update items among items in the item list by using the longest increasing subsequence; and an item sorting unit, which performs item sorting on the items on the basis of the update, wherein the update is performed using multiple sorting indexes, which correspond to the update items, and the item sorting is performed using the multiple sorting indexes.

The item updating unit may include: an excluded item selecting unit, which selects excluded items that correspond to the longest increasing subsequence from among the items in the item list; and an update item selecting unit, which selects the update items by excluding the excluded items from the items.

The item sorting apparatus may further include an item group generating unit, which groups adjacent items among the items in the list to generate item groups; an excluded group selecting unit, which selects excluded groups, which correspond to the longest increasing subsequence, from among the item groups; and an update group selecting unit, which selects update groups by excluding the excluded groups from the item groups, wherein the updating unit updates the update items corresponding to the update groups among the items.

The item group generating unit may group items having an increase in update order of 1 therebetween among the items in the item list.

The item updating unit may perform the update only on the update items, without performing the update on the excluded items.

The excluded item selecting unit may select, as the excluded items, items of which update orders are included in the longest increasing subsequence from among the items, and the excluded group selecting unit may find the longest increasing subsequence by using startup orders respectively corresponding to the item groups and may select, as the excluded groups, item groups corresponding to the startup orders included in the longest increasing subsequence.

The update orders may be changed according to the item sorting.

The item sorting unit may update the update items by using auxiliary indexes of the multiple sorting indexes for items of which primary indexes of the multiple sorting indexes are identical among the items.

Advantageous Effects

In accordance with the present invention having the above configuration, for a server system of a store that provides various kinds of content or items, when update is performed on several items at one time, the workload on the serer system attributable to the item update can be reduced by searching to provide a value for reducing the update workload to a minimum.

In addition, according to the present invention, the server system of a store that provides items can be more effectively managed by reducing the load on the server system attributable to item update.

In addition, according to the present invention, items to be updated among items included in an item list can be effectively found using an item group to remarkably reduce the system workload for updating the items.

DESCRIPTION OF DRAWINGS

FIG. 3 illustrates an item sorting process

FIG. 8 illustrates an item sorting process using multiple sorting indexes according to an embodiment of the present invention.

FIG. 9 illustrates an item sorting process using multiple sorting indexes according to another embodiment of the present invention.

BEST MODE

Figure 1:
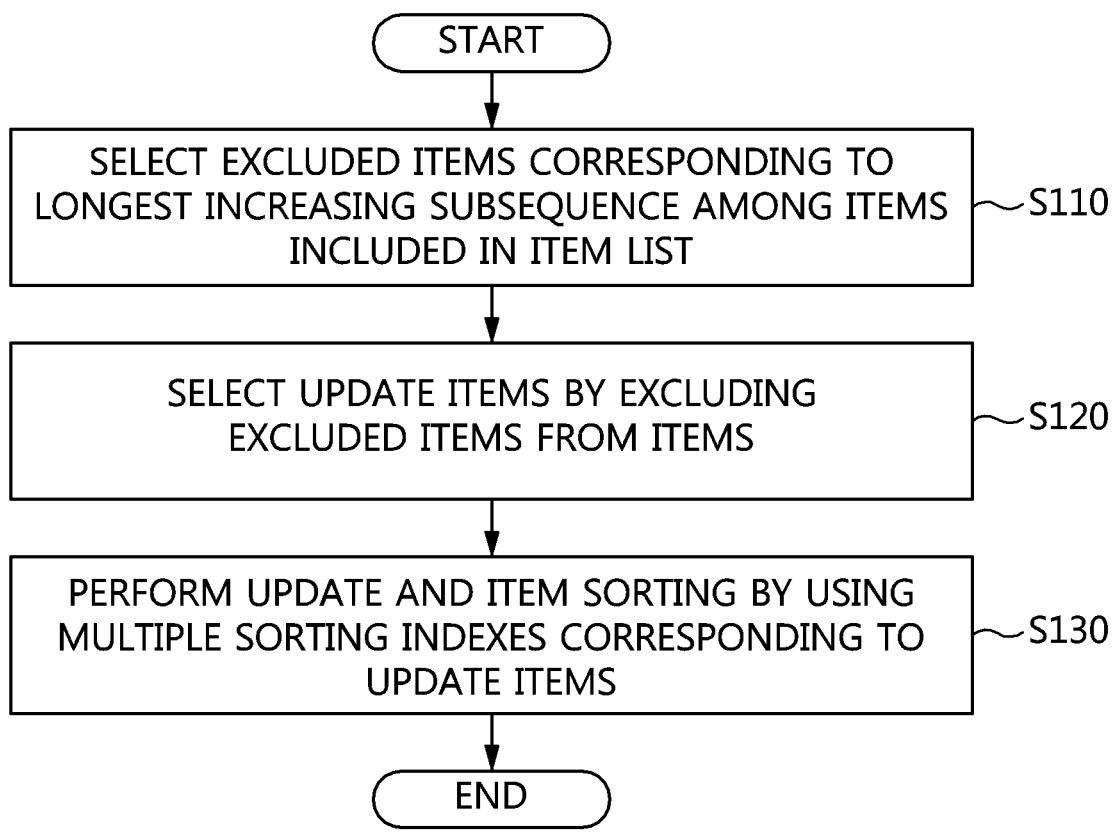
FIG. 1 is an operation flowchart illustrating an item sorting method according to an embodiment of the present invention.

Hereinafter, embodiments of the present invention will be described in detail with reference to the accompanying drawings. In describing the present invention, a detailed description of known functions and configurations will be omitted when it may obscure the subject matter of the present invention. In addition, it should be noted that like reference numerals refer to like or similar elements throughout the drawings.

Terms and words used herein should not be construed limitedly by the common and dictionary meanings, but should be interpreted by meaning and concepts conforming to the technical idea of this invention based on the principle that the concept of terms and words can be defined properly by the inventor in order to describe this invention in the best ways. Accordingly, it should be apparent to those skilled in the art that the following description of exemplary embodiments of the present invention is provided for illustration purpose only and not for the purpose of limiting the invention as defined by the appended claims and their equivalents. It will be understood that, although the terms "first", "second", etc., may be used herein to distinguish one element from another element, the invention is not to be limited by the terms.

FIG. 1 is an operation flowchart illustrating an item sorting method according to an embodiment of the present invention.

Referring to FIG. 1, an item sorting method according to an embodiment of the present invention may select excluded items corresponding to a longest increasing subsequence from among items included in an item list (S110).

At this point, the items may respectively correspond to a product, content, service, or the like. Products, contents, and services available through a smartphone or tablet PC may be provided through various types of stores, such as an application store, book store, music store etc. according to the type thereof. These items may be exposed to users through an item list. In addition, when the item list is displayed, exposure rankings of items, which are included in the item list, may be determined in consideration of the popularity or recency of each item included in the item list. Since the popularity of recency is taken into account, the exposure rankings may be frequently changes as time passes. According, a server system for providing the items may update information stored therein in real time according to changes in the exposure ranking of items in order to provide newly updated information to users.

However, in order to update the information stored in a system, updating all the numerous items every time may impose a large load on the system. Accordingly, at the time of updating items, the update may be performed by finding values for enabling the update workload processed by the system to be reduced to a minimum.

At this point, a longest increasing subsequence may be used for finding the values for enabling the update workload processed by the system to be reduced to a minimum. The longest increasing subsequence is the longest subsequence among value-increasing subsequences, and is the subsequence having the longest length when numbers are selected in ascending order.

In addition, with the longest increasing subsequence, it is possible to update an item list, which is configured only with items in a predetermined category, in correspondence with changes in exposure rankings in an item list where items in various categories co-exist. For example, it is assumed that there is an item list 'A' where items in categories of "games," "life," "language" etc. co-exist. When the exposure ranking of a game item 'a' included in the item list 'A' is changed, the exposure ranking of the game item 'a' may be updated in an item list 'B,' which is configured only with items corresponding to the games category.

In addition, the most efficient currently known algorithm, with which the calculation complexity of the longest increasing subsequence is obtained, is $O(n \log(n))$, where n denotes the number of input sequences, that is, the number of items. For example, when 1024 items are included in an item list, the calculation complexity for selecting items to be updated through the longest increasing subsequence from a corresponding item list may be about $O(10000)$.

In addition, the update order may be the order in which items included in the item list are arrayed according to a change such as a change in exposure ranking. For example, when the ranking of the fifth ranked item is changed to the first ranking among first to fifth ranked items, the update order thereof may be 5-1-2-3-4. In other words, the update order may correspond to a ranking change before and after a unit update is performed.

At this point, items of which update orders are included in a longest increasing subsequence may be selected as excluded items. For example, when update orders of 5 items are 1-4-2-3-5, the longest increasing subsequence in the update orders may be 1-2-3-5, which has update orders of 4 items as a sequence. Accordingly, among the 5 items respectively corresponding to the update orders of 1-4-2-3-5, 4 items of which update orders are included in 1-2-3-5, which is the longest increasing subsequence, may be selected as excluded items.

At this point, the update order may be changed according to the item sorting. The update items are continuously selected and updated according to the exposure rankings of items, which are frequently changed, and since the item sorting is performed on the basis of the update, the update order may be changed according to the item sorting. For example, when it is assumed that there are 5 items in an array of 1-2-3-4-5, update orders thereof such as 1-5-2-3-4, may be generated by changes in the exposure ranking of items. In this way, the items may be updated and sorted according to the update order, and thereafter, the update orders may be changed again to 3-4-1-5-2 attributable to changes in the exposure ranking of items.

In addition, the item sorting method according to an embodiment of the present invention may select update items by excluding excluded items from among the items (S120). At the time of update, due to the changes in exposure ranking of items included in the item list, a system may be smoothly driven by reducing the system workload caused by the update to a minimum. Accordingly, only remaining items obtained by excluding the excluded items, which are selected using the longest increasing subsequence, from among the items included in the item list may be selected as update items to be updated. For example, items corresponding to update orders of 1-2-3-4, which correspond to the longest increasing subsequence among the items corresponding to the update orders of 1-5-2-3-4, may be selected as the excluded items. Accordingly, only an item corresponding to the remaining update order of 5 may be selected as an update item.

In addition, in an item sorting method according to an embodiment of the present invention, update and item sorting may be performed using multiple sorting indexes corresponding to the update items (S130). Generally, a single sorting index may be used in order to update or sort an item list of contents that are provided to users in a store that provides the item list as described herein or various kinds of content. However, it requires a very complex calculation process with a single sorting index to update items and contents, of which exposure rankings are frequently changed, and to sort the item list. Accordingly, since multiple sorting indexes with two or more indexes are used in the present invention, an item or piece of content may be more efficiently updated in an environment where the exposure ranking thereof if frequently changed. For example, items may be updated using n sorting indexes from $C1$ to $Cn$. The update may be performed using a first sorting index $C1$, and then may be performed step by step using $C2$, $C3$, ..., $Cn$. In addition, the update may be performed only through a value of $C2$, which is a second sorting index, without updating a value of $C1$, which is the first sorting index.

At this point, the update may be performed only on the update items, and may not be performed on the excluded items. For example, when it is assumed that there are 5 items having exposure rankings from first to fifth ranks, the ranking of the item that ranks fifth may be changed to the first rank according to the change in exposure ranking. When an existing update method is used, the item that ranks fifth is updated to the first rank and the rankings of items corresponding to the first to fourth ranks are updated by one rank, which requires a total of 5 updates. However, since it is likely that a large load will be placed on a system when the number of items is large, this update method is not suitable for a store that provides a large amount of content. Accordingly, through the longest increasing subsequence, items corresponding to the first to fourth ranks may be selected as excluded items to be excluded from the update task. In addition, since only the item at the fifth rank, which remains by excluding the excluded items from among the items, is selected and updated, the system workload may be remarkably reduced.

At this point, for items of which primary indexes of the multiple sorting indexes are identical among the items, the item sorting may be performed using auxiliary indexes of the multiple sorting indexes. The primary index may be a first sorting index, and the auxiliary index may be a second sorting index of the multiple sorting indexes. For example, when the primary and auxiliary indexes of each item are represented in a type of (x, y) in the order, it may be assumed that there are 5 items of A(1,0), B(2,0), C(3,0), D(4,0), and E(5,0). When the item 'E' is ranked behind the item 'A' in update orders, the multiple sorting indexes of the item 'E' may be updated to the type of E(2,0) in consideration of the primary index of the item 'A'. However, in this case, since the updated sorting index of the item 'E' is identical to the item B(2,0), an error may occur in the system at the time of item sorting. Accordingly, when an auxiliary index in a type of E(2, −1) is used, the system may smoothly perform item sorting.

At this point, update items may be updated in consideration of multiple sorting indexes of items that have a difference in update order of 1 from the update items. For example, when it is assumed that there are 5 items, namely A(1,0), B(2,0), C(3,0), D(4,0), and E(5,0), and the item 'E' is changed to be next to the item 'A' in update orders, the multiple sorting indexes of the item 'E' may be updated to either E(2,−1) or E(1,1), E(2,−1) may be the update type of the multiple sorting indexes corresponding to the case where the item 'B', which is ranked behind the item 'E', is considered in the update orders. In addition, E(1,1) may be the update type of the multiple sorting indexes corresponding to the case where the item 'A', which is ranked ahead of the item 'E', is considered in the update orders.

At this point, when the primary indexes of items that have a difference in update order by 1 from the update items are identical, the update items may be updated by changing the auxiliary index of any one of the items that has a difference in update order by 1 from the update items. For example, when it is assumed that there are 3 items, namely A(1,0), B(1,1), and C(2,0), and the item 'C' is changed to be ranked behind the item 'A' in update orders, it may be difficult to sort items only by updating multiple sorting indexes of the item 'C'. This is because an auxiliary index of the item 'C' may not be set as an integer value between '0' and '1', since the primary indexes of the items 'A' and 'B' are identical and auxiliary indexes thereof are respectively '0' and '1'. Accordingly, the auxiliary index of the item 'B' may be updated therewith, as in A(1,0), C(1,1), and B(1,2). Alternatively, item sorting may be performed by updating the auxiliary index of the item 'A' therewith, as in A(1,−1), C(1,0), and B(1,1).

At this point, the update items may be updated in consideration of the number of items of which primary indexes are identical to those of items that have differences in update order by 1 from the update items. For example, when it is assumed that there are 5 items, namely A(1,−1), B(1,0), C(1,1), D(2,0), and E(3,0), and the item 'E' is changed to be ranked behind the item 'A' in the update orders, the multiple sorting indexes of the item 'E' may be updated to either E(1,2) or D(2,−1). When the multiple sorting indexes are updated to a type of E(1,2), item sorting may be performed using auxiliary indexes of 4 items 'A', 'B', 'C', and 'D' of which primary indexes are identical.

However, when the multiple sorting indexes are updated to a type of E(2,−1), since item sorting may be performed using auxiliary indexes of the items 'E' and 'D' of which primary items are identical, the system workload for updating may be further reduced. Accordingly, when the number of items of which primary indexes are identical is considered, the system workload may be reduced by updating multiple sorting indexes of a part where the number of items of which primary indexes are identical is relatively smaller.

At this point, the update items may be updated using at least one auxiliary index included in the multiple sorting indexes. For example, when two auxiliary indexes exist for a primary index included in the multiple sorting indexes, the updated items may be updated using each auxiliary index step by step. When it is assumed that two auxiliary indexes for a primary index are first and second auxiliary indexes, respectively, and the indexes are represented as (x, y, z), three items may be represented as A(1,0,0), B(1,1,0), C(2, 0,0). At this point, when an item 'C' is changed to be ranked behind the item 'A' in the update orders, the multiple sorting indexes of the item 'C' may be updated to a type of C(1,1,−1).

With this item sorting method, the system workload attributable to update may be remarkably reduced to help the system to be more efficiently used by selecting items to be updated from among various items in an item list.

Figure 2:
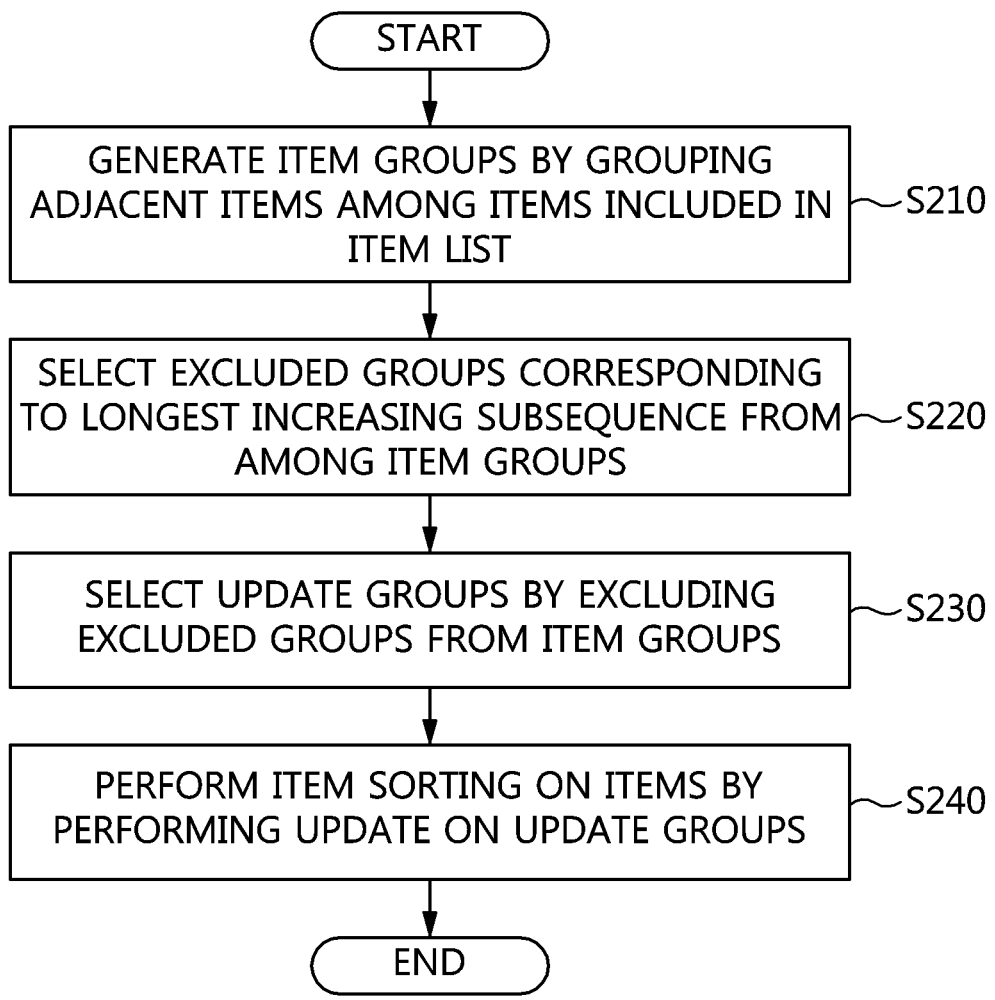
FIG. 2 is an operation flowchart illustrating an item sorting method according to another embodiment of the present invention.

FIG. 2 is an operation flowchart illustrating the item sorting method according to another embodiment of the present invention.

Referring to FIG. 2, the item sorting method according to this embodiment of the present invention may generate item groups by grouping adjacent items among items included in an item list (S210).

In actual service, there may be many cases where exposure rankings are changed only for a relatively small number of items compared to the number of items included in the item list. Accordingly, in this case, in order to update and sort the appropriate items, the items of which update orders increase among adjacent items are grouped to perform item sorting.

At this point, items having an increase in update order of 1 therebetween among the items included in the item list may be grouped. For example, when items are arrayed in the update orders of 1-2-3-4-5-6-4-7-8-9-10-11-12-13-14-15, from the item corresponding to an update order 1 to the item corresponding to an update order 3, the items having an increase in update order of 1 therebetween are grouped to generate the item group G1(1,2,3).

In addition, update orders may be the order in which the items included in the item list are arrayed according to a change such as a change in exposure raking. For example, when the ranking of a fifth ranked item is changed to a first ranking among first to fifth ranked items in the item list, the update orders in the sequence may be 5-1-2-3-4. In other words, the update orders may correspond to the ranking change before and after a unit update is performed.

Accordingly, three item groups, namely G2(5,6), G3(4), and G4(7,8,9,10,11,12,13,14,15), may be further generated via the same method as the method for generating the item group G1(1,2,3). Each of these item groups may have a startup order and group size. For example, for the item group G1(1,2,3), the startup order thereof may be '1' and the group size thereof may be '3', which is the number of items included in the group. This startup order and group size may be used for selecting the update group to be updated among the item groups.

In addition, an item sorting method according to an embodiment may select excluded groups corresponding to the longest increasing subsequence from among the item groups (S220). The longest increasing subsequence may be used to find values for the case where the update workload to be processed in a system may be reduced to a minimum. The longest increasing subsequence is the longest sequence among value-increasing subsequences, and is the sequence having the longest length when numbers are selected in ascending order. Accordingly, items for minimizing the system workload may be selected by excluding, from update targets, items corresponding to the longest increasing subsequence, which corresponds to sequentially increasing numbers. For example, when 5 items have update orders of 1-4-2-3-5, the longest increasing subsequence so the update orders may be 1-2-3-5, which includes update orders of 4 items as a sequence. In addition, items, which correspond to update orders corresponding to 1-2-3-5, which is the longest increasing subsequence, may be selected as the excluded items.

By using the longest increasing subsequence, it is possible to update an item list that is configured only with items in a predetermined category in correspondence with changes in exposure ranking in an item list where items in various categories co-exist. For example, it is assumed that there is an item list 'A' where items in categories of "games," "life," "language" etc. co-exist. When the exposure ranking of a game item 'a' included in the item list 'A' is changed, the exposure ranking of the game item 'a' may also be updated in the item list 'B', which is configured only with items corresponding to the games category.

In addition, the most efficient currently know algorithm with which the calculation complexity of the longest increasing subsequence can be obtained is O(n log(n)), where n denotes the number of input sequences, that is, the number of items. For example, when 1024 items are included in an item list, the calculation complexity for sorting the items to be updated through the longest increasing subsequence in a corresponding item list may be about O(10000).

However, when the calculation complexity of the longest increasing subsequence is calculated through item groups in which items are grouped, the calculation complexity may be a value of O(the square of the number of groups). For example when 4 item groups are generated by grouping 1024 items included in an item list and the calculation complexity of the longest increasing subsequence is calculated through the item groups, the calculation complexity may be O(16), which is O(the square of the number of groups). In this way, since update items may be actually selected with remarkable fewer calculation, the system workload may be reduced by grouping items and performing item sorting.

At this point, the longest increasing subsequence may be found using a startup order corresponding to each of the item groups, and item groups that correspond to the startup orders include in the longest increasing subsequence may be selected as excluded groups. For example, when it is assumed that item groups G1(1,2,3), G2(5,6), G3(4), and G4(7,8,9,10,11,12,13,14,15) are generated, the longest increasing subsequence (1,5,7) may be found using startup orders '1', '5', '4', and '7' of the item groups. G1(1,2,3), G2(5,6) and G4(7,8,9,10,11,12,13,14,15), which are item groups corresponding to the startup orders included in the longest increasing subsequence (1,5,7) found in this way, may be selected as the excluded groups.

At this point, when the number of longest increasing subsequences is two or more, the excluded groups may be selected in consideration of the group sizes of item groups corresponding to the startup orders included in the longest increasing subsequences. For example, when it is assumed that item groups of G1(1,2,3), G2(5,6), G3(4), and G4(7,8,9,10,11,12,13,14,15) are generated, the two longest increasing subsequences of (1,5,7) and (1,4,7) may be found using the startup orders '1', '5', '4', and '7' of the item groups. At this point, since the item groups that correspond to the startup orders included in the longest increasing subsequence are selected as the excluded groups, the excluded groups, which are selected using the longest increasing subsequences of (1,5,7) and (1,4,7), may be different from each other. However, since the present invention aims to provide an update value for performing task so as to impose a smaller workload on the system at the time of item update, a value for allowing more items to become exclusion targets in the update may be selected. Accordingly, the excluded groups may be selected using (1,5,7) for enabling more items to be excluded between the two longest increasing subsequences.

As described above, the most efficient currently known algorithm for selecting the longest increasing subsequence is O(n log(n)), where n is the number of input sequences. In the present invention, since the items are grouped, the O(n log(n)) algorithm may not be used. Accordingly, the method for solving the longest increasing subsequence with dynamic programming may be used, and since actual calculation is performed based only on the size and startup order of each group, it is possible to remarkably reduce the amount of calculations. For example, since the method for finding the longest increasing subsequences of item groups and selecting update groups is classified into the case where each item group belongs to update groups or excluded groups, the calculation complexity may be O(the square of the number of groups). Since solutions that are not configured only with net increasing groups, namely, update groups, are not included in a solution set for the long increasing subsequence, actual calculation is performed with remarkably fewer calculation than O(the square of the number of groups).

In addition, an item sorting method according to an embodiment of the present invention may select update groups by excluding excluded items from among the item groups (S230). At the time of updating caused by changes in the exposure ranking of items included in an item list, a system may be smoothly driven by reducing the system workload attributable to the update to a minimum. Accordingly, only remaining item groups obtained by excluding the excluded groups, which are selected using the longest increasing subsequence from among item groups generated using items in the item list, may be selected as update items for updating. For example, when update orders that use the startup orders of the item groups are 1-5-2-3-4, item groups that have startup orders corresponding to update orders of 1-2-3-4, which is the longest increasing subsequence in the update orders, may be selected as the excluded groups. Accordingly, only an item group corresponding to a remaining update order 5 may be selected as an update group.

In addition, in an item sorting method according to an embodiment of the present invention, item sorting for items may be performed by updating the update groups (S240). The update groups among the item groups may be updated. In addition, a server updates the item list by performing the item sorting for the items corresponding to the update and provides the update item list to users.

At this point, the update may be performed only on the update items corresponding to the update groups. For example, when it is assumed that there are 5 items having exposure rankings from first to fifth ranks, the ranking of the item at the fifth rank may be changed to the first rank according to a change in exposure ranking. When an existing update method is used, the item at the fifth rank is updated to the first rank and the rankings of items corresponding to the first to fourth ranks are updated by one rank, which requires a total of 5 updates. However, since it is likely that a load will be imposed on a system when the number of items is large, this update method is not suitable for a store that provides a large number of content items. Accordingly, through the longest increasing subsequence, items corresponding to the first to fourth ranks may be selected as excluded items to be excluded from an update task. In addition, since only the item at the fifth rank, which remains by excluding the excluded items from among the items, is selected and updated, the system workload may be remarkably reduced.

At this point, item sorting may be performed using multiple sorting indexes. Generally, a single sorting index may be used in order to update or sort an item list of contents provided to users in a store that provides the item list as described herein or various kinds of content. However, it may require a very complex calculation process to update items and contents, of which exposure rankings are frequently changed, and to sort the item list with a single sorting index. Accordingly, since multiple sorting indexes with two or more indexes are used in the present invention, an item or piece of content may be more efficiently updated in an environment in which the exposure ranking thereof is frequently changed. For example, an SQL SELECT statement may perform sorting with "order by C1, C2, . . . , Cn" by using n sorting indexes from C1 to Cn. The item sorting may be performed using a first sorting index C1, and then may be performed step by step using C2, C3, . . . , Cn. In addition, the update may be performed based only on the value of C2, which is a second sorting index, without updating the value of C1, which is the first sorting index.

At this point, for items of which primary indexes of the multiple sorting indexes are identical among the items, the item sorting may be performed using auxiliary indexes of the multiple sorting indexes. The primary index may be a first sorting index, and the auxiliary index may be a second sorting index of the multiple sorting indexes. For example, when primary and auxiliary indexes of each item are represented in a type of (x, y) in the order, it may be assumed that there are 5 items A(1,0), B(2,0), C(3,0), D(4,0), and E(5,0). When item 'E' is ranked behind item 'A' in the update orders, the multiple sorting indexes of the item 'E' may be updated to the type of E(2,0) in consideration of the primary index of the item 'A'. However, in this case, since the updated sorting index of the item 'E' is identical to the item B(2,0), an error may occur in the system at the time of item sorting. Accordingly, the item sorting may be smoothly performed in the system by using the auxiliary index as the type of E(2, −1).

At this point, update items may be updated in consideration of multiple sorting indexes of items that have a difference in update order of 1 from the update items. For example, when it is assumed that there are 5 items, namely A(1,0), B(2,0), C(3,0), D(4,0), and E(5,0), and the item 'E' is changed to be ranked behind the item A in the update orders, the multiple sorting indexes of the item E may be updated to either E(2,−1) or E(1,1). E(2, −1) may be the update type of the multiple sorting indexes corresponding to the case where the item B, which is ranked behind the item 'E', is considered in the update orders. In addition, E(1,1) may be the update type of the multiple sorting indexes corresponding to the case where the item 'A', which is ranked ahead of the item E, is considered in the update orders.

At this point, when the primary indexes of items that have a difference in update order of 1 from the update items, are identical, the update items may be updated by changing the auxiliary index of any one of the items that has a difference in update order by 1 from the update items. For example, when it is assumed that there are three items, namely A(1,0), B(1,1), and C(2,0), and the item 'C' is changed to be ranked behind the item 'A' in update orders, it may be difficult to sort items only by updating multiple sorting indexes of the item 'C'. This is because the auxiliary index of the item 'C' may not be set as an integer value between '0' and '1', since the primary indexes of the items 'A' and 'B' are identical and the auxiliary indexes thereof are respectively '0' and '1'. Accordingly, the auxiliary index of the item 'B' may be updated therewith, as in A(1,0), C(1,1), and B(1,2). Alternatively, the item sorting may be performed by updating the auxiliary index of the item A therewith, as in A(1,−1), C(1,0), and B(1,1).

At this point, the update items may be updated in consideration of the number of items of which primary indexes are identical to those of the items that have a difference in update order of 1 from the update items. For example, when it is assumed that there are 5 items, namely A(1,−1), B(1,0), C(1,1), D(2,0), and E(3,0), and the item E is changed to be ranked behind the item 'A' in the update orders, the multiple sorting indexes of the item 'E' may be updated to either E(1,2) or D(2, −1). When the multiple sorting indexes are updated to the type of E(1,2), the item sorting may be performed using auxiliary indexes of 4 items 'A', 'B', 'C', and 'D' of which primary indexes are identical. However, when the multiple sorting indexes are updated to a type of E(2,−1), since the item sorting may be performed using auxiliary indexes of the items 'E' and 'D' of which the primary items are identical, the system workload for updating may be further reduced. Accordingly, when the number of items of which primary indexes are identical is considered, the system workload may be reduced by updating multiple sorting indexes of a part where the number of items of which primary indexes are identical is relatively smaller.

Update may be performed by selecting only update groups to be updated from among item groups with this item sorting method, which may assist the system in performing efficient calculations for item update.

FIG. 3 illustrates the item sorting process.

Referring to FIG. 3, the item sorting process is an updating process in a manner whereby a 'The First Avenger' item, ranked $10^{th}$, is updated to a first rank and nine items at first to ninth ranks are also updated with the rank thereof pushed down by 1. In this process, the system may perform a total of 10 update tasks in order to array the item list.

At this point, in FIG. 3, although the item list including only 10 items is updated and sorted through the item sorting process, the item sorting as illustrated in FIG. 3 may be performed on an item list having a large amount of content or number of items in a store that provides content or items corresponding to various categories. In addition, since various kinds of item lists may exist according to category, the item sorting may be frequently performed on each item list. For example, when the item ranked lowest is updated to the highest rank, as in the case of FIG. 3, in an item list including 10000 items, the system is required to perform update tasks a total of 10000 times, which puts a large load on the system. In addition, for example, when there is an item list where items corresponding to 10 kinds of categories co-exist, the item sorting in this way may be performed on a total of 11 item lists according to each category. Since this update and item sorting process requires a system to perform massive calculations, this item sorting method may not be suitable for a system that is required to provide services with the latest information taken into account.

Figure 4:
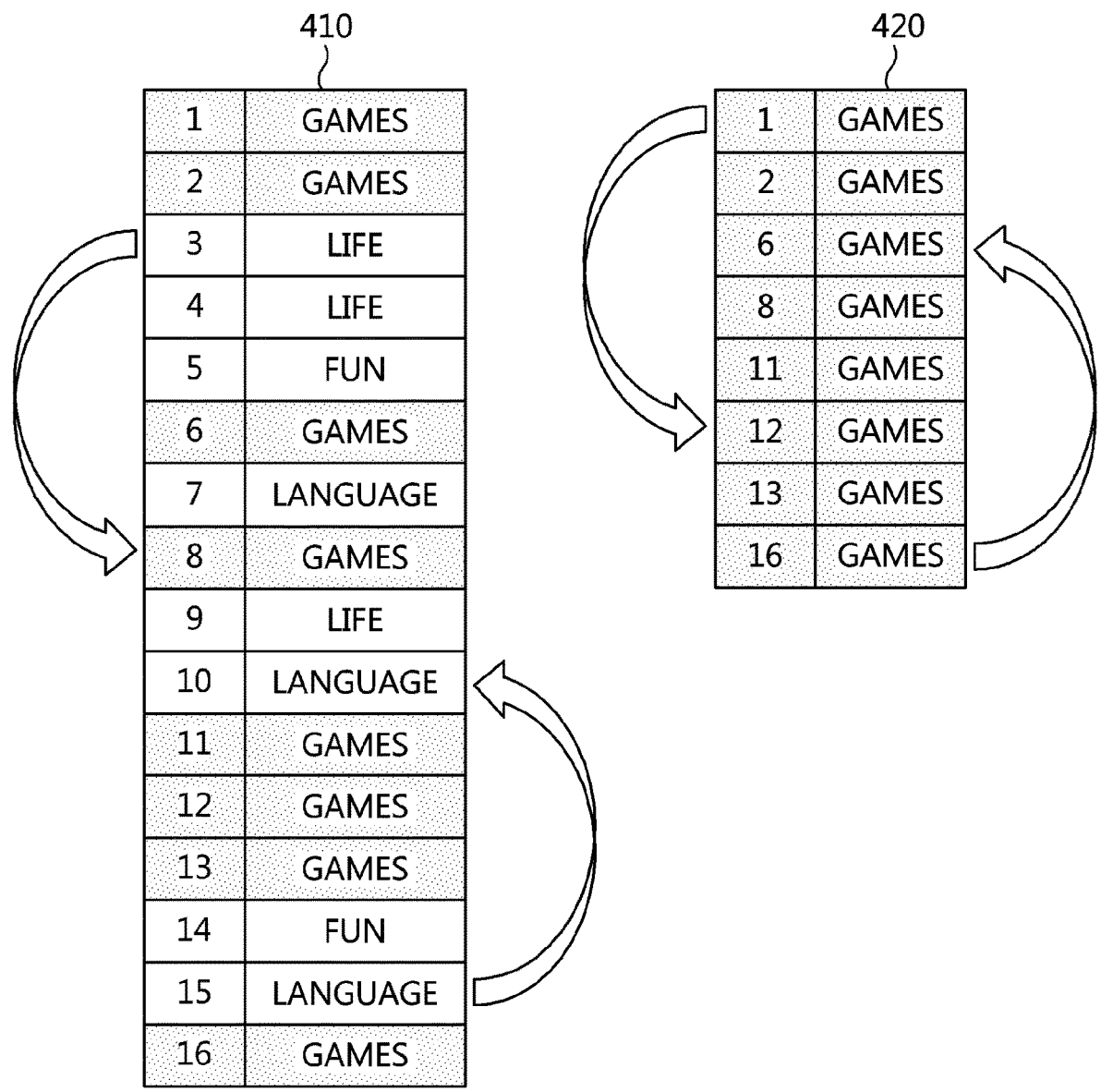
FIG. 4 illustrates item lists according to category.

FIG. 4 illustrates item lists according to category.

Referring to FIG. 4, an item list for a category may include an entire item list 410, in which items corresponding to various categories are mixed, and a category item list 420, which includes only items corresponding to a predetermined category.

The entire item list 410 may be an item list configured with items in all of the categories. The exposure rankings of items included in the entire item list 410 may be changed according to the popularity or recency of corresponding items, regardless of the category to which the corresponding items belong.

At this point, as the exposure ranking of a predetermined item is changed in the entire item list 410, the exposure ranking of a corresponding item may also be changed in the category item list 420, which includes items corresponding to the category to which the corresponding item belongs. In this way, in order to identically apply an item, which is updated according to a change in exposure raking in the entire item list 410, to the corresponding category item list 420, the longest increasing subsequence for update orders may be used in the present invention.

The update orders may be an order in which items included in the item list are arrayed according to a change such as a change in exposure ranking. For example, when it is assumed that an item corresponding to a games category and ranked 16$^{th}$ in the entire item list 410 is an item 'A,' the item 'A' may be at a 10th rank due to a change in exposure ranking. At this point, the update orders may be 1-2-3-4-5-6-7-8-9-16-10-11-12-13-14-15. Accordingly, the longest increasing subsequence for the update orders may be found, and only the item 'A', corresponding to 16, which does not correspond to the longest increasing subsequence, may be updated.

In addition, the update orders of 1-2-6-8-16-11-12-13, may also be generated due to a change in exposure ranking of the item 'A' in the category item list 420 for the games category. In this case, similarly, the longest increasing subsequence for the update orders may be found, and only the item 'A', corresponding to 16, which does not correspond to the longest increasing subsequence, may be updated.

For various item lists, effective updates may be enabled by performing item update and sorting by using the longest increasing subsequence for update orders with respect to changes in the exposure ranking of items.

Figure 5:
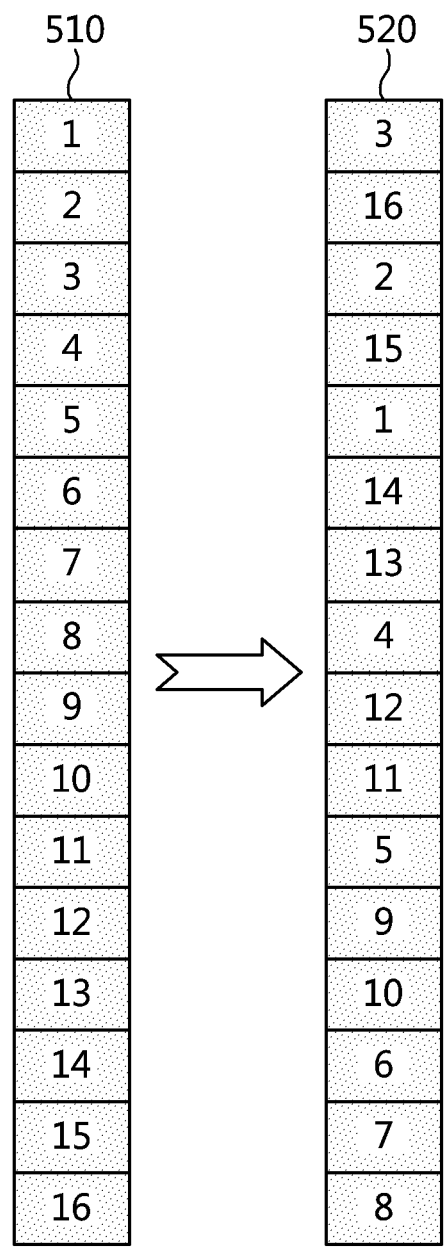
FIG. 5 illustrates a change in ranking of item exposure.

FIG. 5 illustrates a change in the ranking of item exposure.

FIG. 5 illustrates the item list 510 before the change in exposure ranking and the item list 520 after the change in exposure ranking, in which the exposure rankings of many items are changed.

The exposure rankings of items may be changed according to the popularity or recency of items includes in the item list 510 before the change in exposure ranking. At this point, although the exposure rankings may be changed only for a small number of items, there may be many cases where the exposure rankings are changed for a large number of items, like the item list 520 after the change in exposure ranking. In this way, when the exposure rankings of items are complicatedly changed, item sorting may be performed by performing update for all of the items.

However, in the case of a complicated change, when the longest increasing subsequence of the update orders is used, only items to be updated may be found and updated, without updating all the items. For example, the longest increasing subsequence may be found using the numbers listed in the item list 520 after the change in exposure ranking as update orders. For example, the long increasing subsequences 3-4-5-6-7-8, 2-4-5-6-7-8, and 1-4-5-6-7-8 may be found. Accordingly, any one of the longest increasing subsequence is selected, and an item corresponding to the selected longest increasing subsequence is selected as an excluded item, whereby the number of update items to be updated may be selected as 10. Even in the case of a complicated change in exposure ranking, the minimum amount of items to be updated are determined and updated without updating all of the items included in the item list by using the longest increasing subsequence, which may result in a reduction in the update-related workload of the system.

Figure 6:
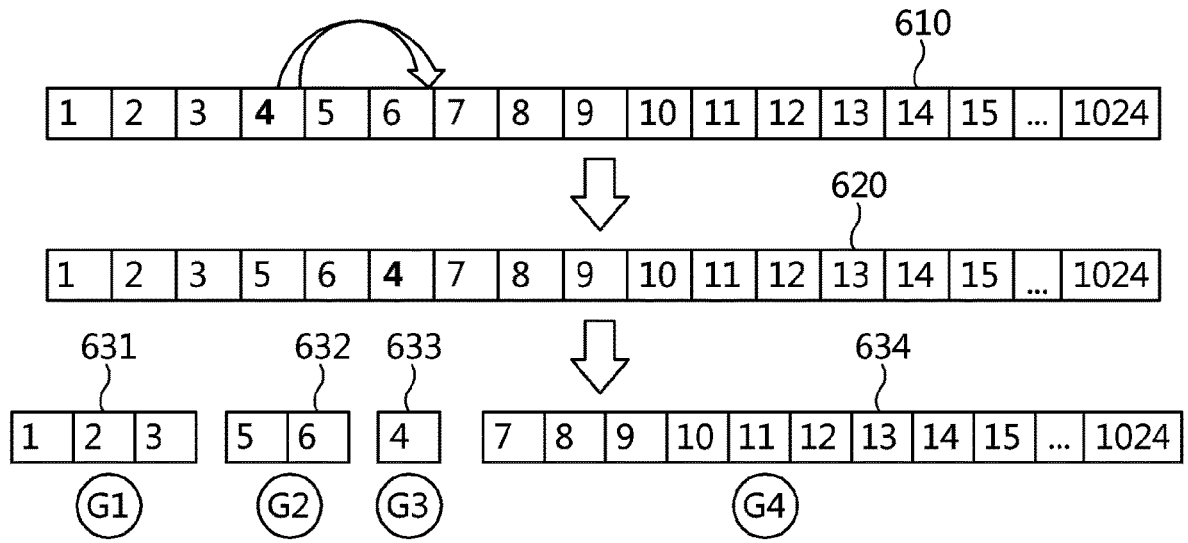
FIG. 6 illustrates the process for generating item groups according to an embodiment of the present invention.

FIG. 6 illustrates a process for generating item groups according to an embodiment of the present invention.

FIG. 6 illustrates an item array 610, which represents the state before the exposure rankings of items are changed in the item list of a store.

In the item array 610, when the exposure ranking of an item corresponding to number 4 is changed, the item array may be changed to update orders 620.

At this point, item groups may be generated by grouping adjacent items of which update orders increase by 1 between items included in the update orders 620. For example, from the item corresponding to 1 that is a first of the update orders 620 to the item corresponding to 3, the items having an increase in update order of 1 therebetween may be grouped. Thereafter, from the item corresponding to 5 that is a next update order to the item corresponding to 6, the items having an increase in update order of 1 therebetween may be grouped. By grouping with a method like this, item groups of G1 631, G2 632, G3 633 and G4 634 may be generated.

At this point, the longest increasing subsequence of (1,5,7) may be found using '1', '5', '4', and '7', which are respective startup orders of the item groups, and item groups corresponding to the startup orders included in the longest increasing subsequence may be selected as excluded groups. In addition, although the subsequence (1,4,7) is the longest increasing subsequence, when considering the size of the item group, (1,5,7) for enabling a larger number of items to be excluded from update targets may be used as the longest increasing subsequence to select the excluded groups.

At this point, when items included in the update orders 620 are not grouped and excluded items are selected using the longest increasing subsequence, the calculation complexity may be about O(10000) through the algorithm O(n log(n)). However, when items included in the update orders 620 are grouped and the calculation complexity of the longest increasing subsequence is calculated through the item groups, the calculation complexity may be O(16), which is the value of O(the square of the number of groups). In this way, since update items may be actually selected with remarkably fewer calculations, the system workload may be reduced by grouping items and performing item sorting.

Figure 7:
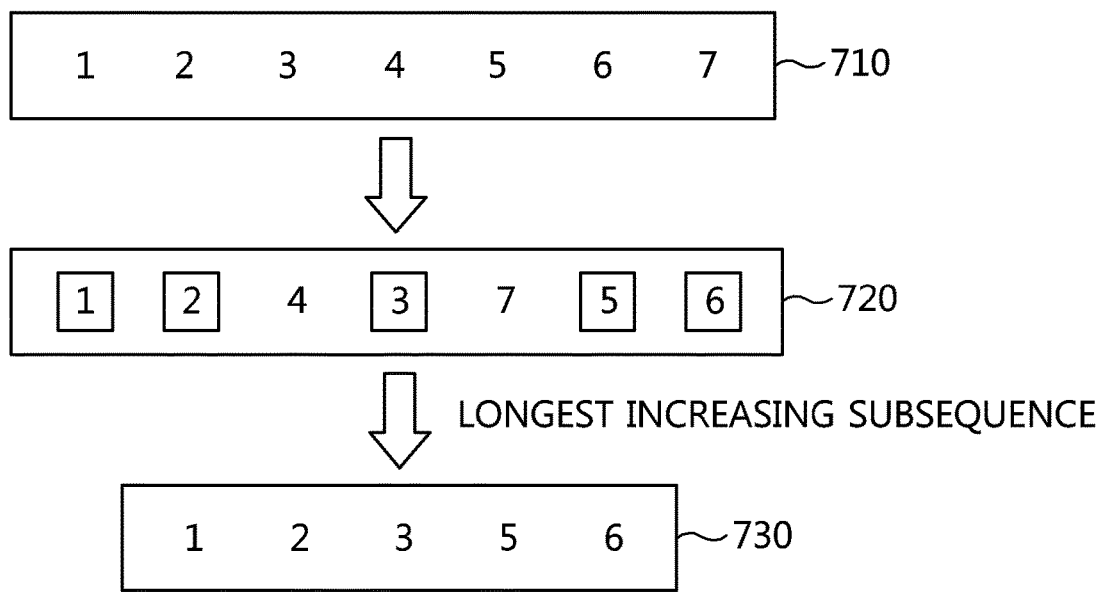
FIG. 7 illustrates an exemplary longest increasing subsequence.

FIG. 7 illustrates an exemplary longest increasing subsequence.

Referring to FIG. 7, each number included in a general sequence 710 may be assumed to be an item. When it is assumed that an array of the numbers included in the general sequence 710 is the exposure ranking in an item list, the item exposure rankings may be changed to an array like a variation sequence 720 due to a change in exposure ranking.

At this point, the update orders may be the order in which the items included in the item list are arrayed according to a change such as a change in exposure ranking. In FIG. 7, the array corresponding to the variation sequence 720 may be update orders.

At this point, excluded items to be excluded from updating may be selected from among items included in the item list through the longest increasing subsequence of the update orders. The longest increasing subsequence is the longest subsequence among value-increasing subsequences, and is the subsequence having the longest length when numbers are selected in ascending order. For example, the longest increasing subsequence in the change sequence 720 may be 1-2-3-5-6. Accordingly, items of which update orders correspond to the longest increasing subsequence may be selected as the excluded items 730.

At this point, items remaining by excluding the excluded items 730 may be selected as update items from among items that correspond to the update orders of the variation sequence 720. Accordingly, only the update items among items included in the item list may be updated. For example, in FIG. 7, items of which update orders respectively correspond to 4 to 7 in the change sequence 720 may be updated. In this way, only the update items to be updated are selected from among items included in the item list by using the longest increasing subsequence and then updated in order to reduce the update workload processed by the system to a minimum.

FIG. 8 illustrates an item sorting process using multiple sorting indexes according to an embodiment of the present invention.

Referring to FIG. 8, in an item sorting process using multiple sorting indexes according to an embodiment of the present invention, an exposure ranking is changed so that an item 'E' included in an item list 810 before the ranking change is ranked behind an item 'A' in update orders.

From an item list 820 alter the ranking change, it may be seen that the item 'E' is moved behind the item 'A' in the update orders and primary and auxiliary indexes of the item 'E' are respectively updated to (2,−1). In this way, due to update using the multiple sorting indexes, at the time of item sorting, an item 'B', of which the primary index is the same as that of the item 'E' of the item list 720 after the ranking change, may be sorted using an auxiliary index. For example, as illustrated in FIG. 8, the item of which an auxiliary index is '−1', may be ranked ahead of the item 'B' in the item list.

In addition, the primary and auxiliary indexes of the item 'E' may be respectively updated (1,1) to perform item sorting. In this case, an item 'A' of which an auxiliary index is the same as that of the item 'E' of the item list 820 after a ranking change may be sorted using the auxiliary index. For example, the item 'E' of which the auxiliary index is '1' may be ranked behind the item 'A'.

At this point, when primary indexes of items that have a difference in update order of 1 from the update items are identical, the update items may be updated by changing the auxiliary index of any one of the items that have a difference in update order of 1 from the update items. For example, after the ranking change, when it is assumed that an item 'D' in the item list 820 is moved behind the item 'E', the item 'D' may be updated while any one of auxiliary indexes of the items 'E' and 'B' is updated together. When the auxiliary index of the item 'E' is updated together, multiple sorting indexes may be updated to the type of E(2,−2), D(2,−1), and B(2,0). In addition, when the auxiliary index of the item 'E' is updated together, multiple sorting indexes may be updated to the type of E(2,−1), D(2,0), and B(2,1).

FIG. 9 illustrates an item sorting process using multiple sorting indexes according to another embodiment of the present invention.

Referring to FIG. 9, it may be seen that an item sorting process using multiple sorting indexes according to another embodiment of the present invention is performed by performing an update so that an item 'C' included in an item list 910 with two types of sorting indexes is ranked behind the item 'E' in the update orders.

When the item list 920 with three types of sorting indexes is checked, the item 'C' is moved behind the item 'E' in the update orders and updated to (2,−1,−1) using a second auxiliary index. In this way, when the primary index and a first auxiliary index are identical, the update may be simply performed using the second auxiliary index.

At this point, the update may be performed to a type of C(2,<1) and D(2,−2) without using the second auxiliary index. However, when the number of identical items of which the primary index is '2' is large, since the case may occur where the first auxiliary indexes of many items are updated, an item may be updated using the second auxiliary index, as illustrated in FIG. 9.

Figure 10:
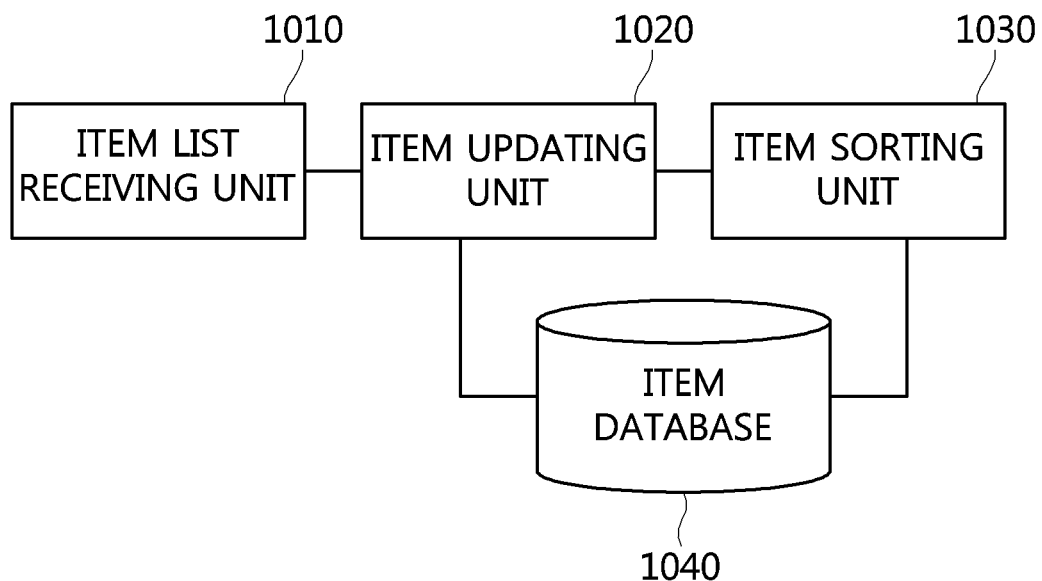
FIG. 10 is a block diagram illustrating an item sorting apparatus according to an embodiment of the present invention.

FIG. 10 is a block diagram illustrating an item sorting apparatus according to an embodiment of the present invention.

Referring to FIG. 10, an item sorting apparatus 1000 according to an embodiment of the present invention may include an item list receiving unit 1010, an item updating unit 1020, an item sorting unit 1030, and an item database 1040.

The item list receiving unit 1010 may receive an item list from a server. For example, the item list may be received from a server system for managing an app store that provides a mobile application, or a store that provides content and an item executable using a smartphone or tablet PC. This item list may be diversified from an item list in which items in all the categories are combined to an item list of items in each category.

The item updating unit 1020 may perform update on update items among the items in an item list by using the longest increasing subsequence. In addition, the item updating unit 1020 may perform update on the update items by using multiple sorting indexes corresponding to the update items.

At this point, the items may respectively correspond to products, content, services, or the like. Products, content, and services available through a smartphone or tablet PC may be provided through various types of stores, such as an application store, book store, music store, etc. according to the type thereof. These items may be exposed to users through the item list. In addition, when the item list is displayed, exposure rankings of items included in the item list may be determined in consideration of the popularity or recency of the items included in the item list. Since popularity and recency are taken into account, such an exposure ranking may frequently change as time passes. Accordingly, a server system for providing an item may update information stored therein in real time according to changes in exposure ranking of items in order to provide newly updated information to users.

However, an operation for updating all of the numerous items every time in order to update the information stored in a system may impose a large load on the system. Accordingly, at the time of updating items, the update may be performed by finding values that enable the update workload processed by the system to be reduced to a minimum.

The longest increasing subsequence may be used for finding values for the case where the update workload to be processed in a system may be reduced to a minimum. The longest increasing subsequence is the longest subsequence among value-increasing subsequences, and is the subsequence having the longest length when numbers are selected in ascending order.

In addition, it is possible to update, using the longest increasing subsequence, an item list that is configured only with items in a predetermined category in correspondence with a change in exposure ranking in an item list in which items in various categories co-exist. For example, it is assumed that there is an item list 'A' in which items in categories of "games," "life," "language" etc. co-exist. When the exposure ranking of a game item 'a' included in the item list 'A' is changed, the exposure ranking of the game item 'a' may also be updated in the item list 'B,' winch is configured only with items corresponding to the games category.

In addition, the most efficient currently known algorithm with which the calculation complexity of the longest increasing subsequence is obtained is O(n log(n)), where n denotes the number of input sequences, namely, the number of items. For example, when 1024 items are included in an item list, the calculation complexity for sorting items to be updated through the longest increasing subsequence in a corresponding item list may be about O(10000).

In addition, update orders may be a sequence wherein items included in the item list are arrayed according to a change such as change in exposure ranking. For example, when the ranking of the fifth ranked item is changed to the first ranking, among first to fifth ranked items in the item list, updating orders may be 5-1-2-3-4. In other words, the update orders may correspond to the ranking change relationship before and after unit update is performed. Accordingly, the longest increasing subsequence is found for update orders of items and the items of which update orders correspond to the longest increasing subsequence may be selected as excluded items and may be excluded from the update.

At this point, the excluded items corresponding to the longest increasing subsequence may be selected from among the items included in the item list, and the update items may be selected by excluding the excluded items from the items. The excluded items, which correspond to the longest increasing subsequence, may be selected from among the items included in the item list.

At the time of updating caused by the changes in exposure ranking of the items included in the item list, the system may be smoothly driven by reducing the system workload attributable to the update to a minimum. Accordingly, only remaining items obtained by excluding the excluded items, which are selected from among the items included in the item list by using the longest increasing subsequence, may be selected as the update items for updating. For example, items corresponding to update orders of 1-2-3-4, which correspond to the longest increasing subsequence among items corresponding to the update orders of 1-5-2-3-4, may be selected as the excluded items. Accordingly, only an item corresponding to a remaining update order of 5 may be selected as an update item.

At this point, the update may be performed only on the update items, and may not be performed on the excluded items. For example, when it is assumed that there are 5 items having exposure rankings from first to fifth rank, the ranking of the item at the fifth position may be changed to first according to the change in exposure ranking. When an existing update method is used, the item at the fifth position is updated to first and the rankings of the items corresponding to the first to fourth ranks are updated by 1, which requires a total of 5 updates. However, since it is likely that a load will be imposed on a system when the number of items is large, this update method is not suitable for a store that provides a large number of content items. Accordingly, through the longest increasing subsequence, items corresponding to the first to fourth ranks may be selected as the excluded items to be excluded from the update task. In addition, since only the item in the fifth rank, which remains by excluding the excluded items from among the items, is selected and updated, the system workload may be remarkably reduced.

At this point, items of which update orders are included in the longest increasing subsequence may be selected as the excluded items. For example, when 5 items have update orders of 1-4-2-3-5, the longest increasing subsequence in the update order may be 1-2-3-5, which has update orders of 4 items as a sequence. Accordingly, among 5 items respectively corresponding to update orders of 1-4-2-3-5, 4 items of which update orders are included in 1-2-3-5, which is the longest increasing subsequence, are selected as the excluded items.

At this point, the update orders may be changed according to the item sorting. The update items are continuously selected and updated according to the exposure rankings of items, which are frequently changed, and since item sorting is performed on the basis of the update, the update orders may be changed according to the item sorting. For example, when it is assumed that 5 items are provided in an array of 1-2-3-4-5, update orders, such as 1-5-2-3-4, may be generated due to a change in the exposure ranking of items. According to the update orders, the items may be updated and sorted, and thereafter, the update orders may be changed again to 3-4-1-5-2 due to the change in the exposure ranking of items.

At this point, item sorting may be performed using multiple sorting indexes. Generally, a single sorting index may be used in order to update or sort an item list of content provided to users in a store that provides the item list as described herein or various kinds of content. However, it may require a very complex calculation process to update items and content of which the exposure rankings are frequently changed, and to sort an item list with a single sorting index. Accordingly, since multiple sorting indexes with two or more indexes are used in the present invention, an item or piece of content may be more efficiently updated in an environment in which the exposure ranking thereof is frequently changed. For example, items may be updated using n sorting indexes from C1 to Cn. The update may be performed using a first sorting index C1, and may then be performed step by step using C2, C3, . . . , Cn. In addition, the update may be performed only with the value of C2, which is a second sorting index, without updating the value of C1, which is the first sorting index.

At this point, update items may be updated in consideration of multiple sorting indexes of items that have a difference in update order of 1 from the update items. The primary index of the multiple sorting indexes may be the first sorting index, and the auxiliary index thereof may be the second sorting index. For example, when the primary and auxiliary indexes of each item are represented in a type of (x, y) in the order, it may be assumed that there are 5 items, namely A(1,0), B(2,0), C(3,0), D(4,0), and E(5,0). At this point, when the item 'E' is changed to be ranked behind the item 'A' in the update order, multiple sorting indexes of the item 'E' may be updated to either E(2,−1) or E(1,1). E(2, −1) may be an update type of the multiple sorting indexes corresponding to the case where the item 'B', which is ranked behind the item 'E', is considered in the update orders. In addition, E(1,1) may be an update type of the multiple sorting indexes corresponding to the case where the item 'A', which is ranked ahead of the item 'E', is considered in the update orders.

At this point, when the primary indexes of items that have a difference in update order of 1 from the update items are identical, the update items may be updated by changing the auxiliary index of any one of the items that has a difference in update order of 1 from the update items. For example, when it is assumed that there are 3 items, namely A(1,0), B(1,1), and C(2,0), and the item C is changed to be ranked behind the item 'A' in the update orders, it may be difficult to sort items only by updating multiple sorting indexes of the item 'C'. This is because the auxiliary index of the item 'C' may not be set as an integer value between '0' and '1', since the primary indexes of the items 'A' and 'B' are identical and auxiliary indexes thereof are respectively '0' and '1'. Accordingly, the auxiliary index of the item 'B' may be updated therewith, as in A(1,0), C(1,1), and B(1,2). Alternatively, item sorting may be performed by updating the auxiliary index of the item A therewith, as in A(1,−1), C(1,0), and B(1,1).

At this point, the update items may be updated in consideration of the number of items of which primary indexes are identical to the item that differ in update order by 1 from the update items. For example, when it is assumed that there are 5 items, namely A(1, −1), B(1,0), C(1, 1), D(2,0), and E(3,0), and the item 'E' is changed to rank behind the item 'A' in the update orders, the multiple sorting indexes of the item 'E' may be updated to either E(1, 2) or D(2, −1). When multiple sorting indexes are updated to a type of E(1, 2), item sorting may be performed using auxiliary indexes of the 4 items 'A', 'B', 'C', and 'D', of which the primary indexes are identical. However, when the multiple sorting indexes are updated to a type of E(2, −1), since the item sorting may be performed using auxiliary indexes of the items 'E' and 'D' of which primary items are identical, the system workload for updating may be further reduced. Accordingly, when the number of items of which primary indexes are identical is considered, the system workload may be reduced by updating multiple sorting indexes of a part where the number of items of which primary indexes are identical is smaller.

At this point, the update items may be updated using at least one auxiliary index included in the multiple sorting indexes. For example, when two auxiliary indexes exist for a primary index included in the multiple sorting indexes, the update items may be updated using each auxiliary index step by step. When it is assumed that the two auxiliary indexes for the primary index are respectively first and second auxiliary indexes and the indexes are represented as (x, y, z), three items may be represented as A(1,0,0), B(1,1,0), C(2, 0,0). At this point, when the item 'C' is changed to be ranked behind the item 'A' in the update orders, multiple sorting indexes of the item 'C' may be updated to a type of C(1,1,−1).

The item sorting unit 1030 may perform item sorting on items on the basis of an update. At this point, the item sorting unit 1030 may perform item sorting on the items by using multiple sorting indexes. As the update items are updated, the item sorting may also be performed in order to update the item list to be exposed to the users in the server.

Generally, a single sorting index may be used in order to update or sort an item list of contents that are provided to users in a store that provides the item list as described herein or various kinds of content. However, it may require a very complex calculation process to update items and content of which the exposure rankings are frequently changed, and to sort an item list with a single sorting index. Accordingly, since multiple, i.e. two or more, sorting indexes are used in the present invention, an item or piece of content may be more efficiently updated in an environment in which the exposure ranking thereof is frequently changed. For example, an SQL SELECT statement may perform sorting with "order by C1, C2, . . . , Cn" by using n sorting indexes from C1 to Cn. The item sorting may be performed using a first sorting index C1, and then may be performed step by step using C2, C3, . . . , Cn. In addition, the update may be performed only through a value of C2, which is the second sorting index, without updating the value of C1, which is the first sorting index.

At this point, for items of which primary indexes of the multiple sorting indexes are identical among the items, the item sorting may be performed using auxiliary indexes of the multiple sorting indexes. For example, it may be assumed that there are 5 items, namely A(1,0), B(2,0), C(3,0), D(4,0), and E(5,0). When the item 'E' is ranked behind the item 'A' in the update orders, multiple sorting indexes of the item 'E' may be updated to a type of E(2, 0) in consideration of the primary index of the item 'A'. However, in this case, since the updated sorting index of the item 'E' is identical to that of the item B(2,0), an error may occur in the system at the time of item sorting. Accordingly, the item sorting may be smoothly performed in the system by using the auxiliary index as the type of E(2, −1).

The item database 1040 may store information on the items included in the item list. In addition, the item database 1040 may also store information on the items updated by the item updating unit 1020 and information on the item list sorted by the item sorting unit 1030.

In this way, when several items are updated at one time using the item sorting apparatus 1000, it is possible to reduce the system load by finding and providing a value for enabling the system workload attributable to the update to be reduced to a minimum.

Figure 11:
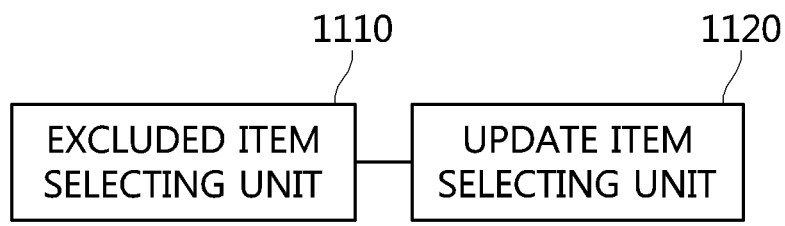
FIG. 11 is a block diagram illustrating an example of the item updating unit of FIG. 10.

FIG. 11 is a block diagram illustrating an example of the item updating unit of FIG. 10.

Referring FIG. 11, the item updating unit 1020 illustrated in FIG. 10 may include an excluded item selecting unit 1110 and an update item selecting unit 1120.

The excluded item selecting unit 1110 may select excluded items corresponding to the longest increasing subsequence from among the items included in the item list.

At this point, items of which the update orders are included in the longest increasing subsequence may be selected as the excluded items. For example, when 5 items have update orders of 1-4-2-3-5, the longest increasing subsequence in the update order may be 1-2-3-5, which has update orders of 4 items as a sequence. Accordingly, among 5 items respectively corresponding to update orders of 1-4-2-3-5, 4 items of which update orders are included in 1-2-3-5, which is the longest increasing subsequence, are selected as the excluded items.

At this point, the update orders may be changed according to the item sorting. The update items are continuously selected to be updated according to the exposure rankings of items, which are frequently changed, and since the item sorting is performed on the basis of the update, the update orders may be changed according to the item sorting. For example, when it is assumed that there are provided 5 items in an array of 1-2-3-4-5, update orders such as 1-5-2-3-4 may be generated due to a change in the exposure ranking of items. In this way, the items may be updated and sorted based on the update order, and thereafter, the update orders may be changed again to 3-4-1-5-2 due to the change in exposure ranking of items.

The update item selecting unit 1120 may select the update items by excluding the excluded items from the items. At the time of updating due to the change in exposure ranking of items included in the item list, the system may be smoothly driven by reducing the system workload caused by the update to a minimum. Accordingly, only remaining item obtained by excluding the excluded items, which are selected using the longest increasing subsequence from among items included in the item list, may be selected as the update items for updating. For example, items corresponding to update orders of 1-2-3-4, which correspond to the longest increasing subsequence among the items corresponding to the update orders of 1-5-2-3-4, may be selected as the excluded items. Accordingly, only the item corresponding to the remaining update order of 5 may be selected as an update item.

Figure 12:
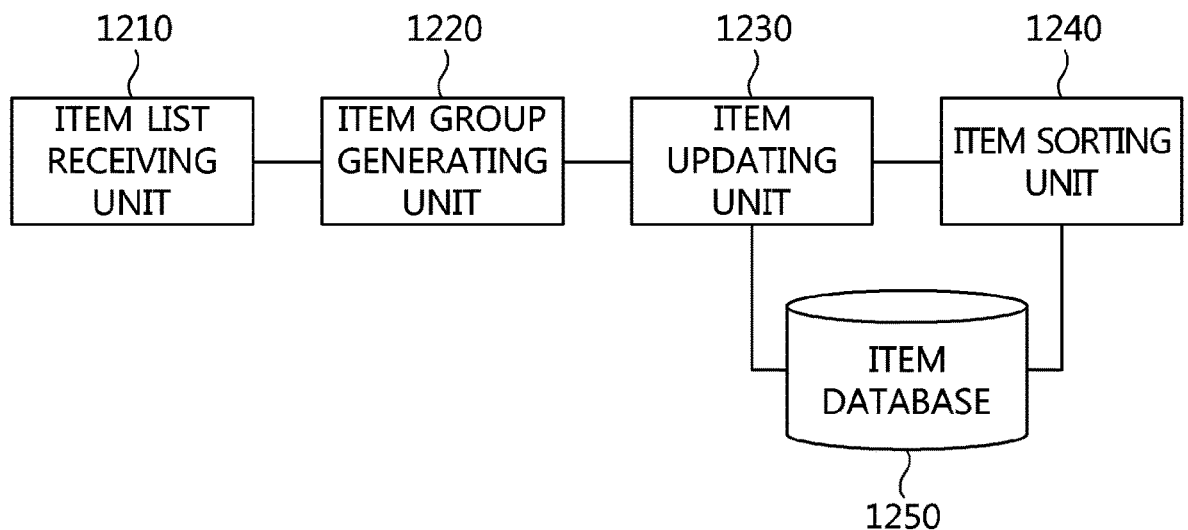
FIG. 12 is a block diagram illustrating an item sorting apparatus according to another embodiment of the present invention.

FIG. 12 is a block diagram illustrating an item sorting apparatus according to another embodiment of the present invention.

Referring to FIG. 12, an item sorting apparatus 1200 according to an embodiment of the present invention may include an item list receiving unit 1210, an item group generating unit 1220, an item updating unit 1230, an item sorting unit 1240, and an item database 1250.

The item list receiving unit 1210 may receive an item list from a server. For example, the item list may be received from a server system for managing an app store that provides a mobile application, or a store that provides content and an item executable by using a smartphone or tablet PC. This item list may be various including an item list in which items in all categories co-exist and an item list of items for each category.

The item group generating unit 1220 may generate item groups by grouping adjacent items among the items included in the item list.

At this point, the items may respectively correspond to a product, content, service, or the like. Products, content, and services available through a smartphone or tablet PC may be provided through various type of stores, such as an application store, book store, music store etc. according to the type thereof. These items may be exposed to users through the item list. In addition, when the item list is displayed, the exposure rankings of the items included in the item list may be determined in consideration of the popularity or recency of each of the items included in the item list. Since the popularity or recency is taken into account, the exposure ranking may be frequently changed as time passes. Accordingly, a server system for providing an item may update information stored therein in real time according to a change in the exposure ranking of items in order to provide newly updated information to users.

However, an operation for updating all of the numerous items every time in order to update the information stored in a system may impose a large load on the system. Accordingly, at the time of updating items, the update may be performed by finding values for enabling the update workload processed by the system to be reduced to a minimum.

In an actual service, there may be many cases where the exposure rankings are changed only for a relatively small number of items compared to the number of items included in the item list. Accordingly, in this case, in order to update and sort appropriate items, the items of which update orders increase among adjacent items are grouped to perform item sorting.

At this point, items having an increase in update order of 1 between the items included in the item list may be grouped. For example, when items are arrayed in update orders of 1-2-3-5-6-4-7-8-9-10-11-12-13-14-15, from the item corresponding to the update order 1 to the item corresponding to the update order 3, the items having an increase in update order of 1 therebetween are grouped to generate an item group G1(1,2,3).

In addition, the update orders may be the order in which the items included in the item list are arrayed according to a change such as a change in exposure ranking. For example, when the ranking of the fifth ranked item is changed to the first ranking among the first to fifth ranked items in the item list, the updated order may be 5-1-2-3-4. In other words, the update orders may correspond to the ranking change before and after unit update is performed.

Accordingly, three item groups, namely G2(5,6) G3(4), and G4(7,8,9,10,11,12,13,14,15), may be further generated with the same method as the method for generating the item group G1(1,2,3). Each of these item groups may have a startup order and group size. For example, for the item group G1(1,2,3), the startup order thereof may be '1' and the group size thereof may be '3', which is the number of items included in the group. This startup order and group size may be used for selecting the update group to be updated among the item groups.

The item updating unit 1230 may update the update groups among the item groups by using the longest increasing subsequence.

At this point, the excluded groups, which correspond to the longest increasing subsequence among the item groups, may be selected. The longest increasing subsequence may be used for finding values for the case where the update workload to be processed in the system may be reduced to a minimum. The longest increasing subsequence is the longest subsequence among value-increasing subsequences, and is the subsequence having the longest length when numbers are selected in ascending order. Accordingly, items for minimizing the system workload may be selected by excluding items corresponding to the longest increasing subsequence, which corresponds to sequentially increasing numbers, from update targets. For example, when 5 items have update orders of 1-4-2-3-5, the longest increasing subsequence in the update orders may be 1-2-3-5, which has update orders of 4 items as a sequence. In addition, the items that correspond to update orders corresponding to 1-2-3-5, which is the longest increasing subsequence, may be selected as the excluded items.

By means of the longest increasing subsequence, it is possible to update an item list that is configured only with items in a predetermined category in correspondence with a change in the exposure ranking in an item list in which items in various categories co-exist. For example, it is assumed that there is an item list 'A' in which items in categories of "games," "life," "language" etc. co-exist. When the exposure ranking of a game item 'a' included in the item list 'A' is changed, the exposure ranking of the game item 'a' may also be updated in an item list 'B', which is configured only with items corresponding to the games category.

In addition, the most efficient currently known algorithm with which the calculation complexity of the longest increasing subsequence is obtained is $O(n \log(n))$, where n denotes the number of input sequences, namely, the number of items. For example, when 1024 items are included in an item list, the calculation complexity for sorting items to be updated through the longest increasing subsequence in a corresponding item list may be about $O(1000)$.

However, when the calculation complexity of the longest increasing subsequence is calculated through the item groups in which items are grouped, the calculation complexity may be a value of O(square of the number of groups). For example, when 4 item groups are generated by grouping 1024 items included in an item list and the calculation complexity of the longest increasing subsequence is calculated through the item groups, the calculation complexity may be O(16), which is O(square of the number of groups). In this way, since update items alone may be selected with remarkably fewer calculations, the system workload may be reduced by grouping items and performing item sorting.

At this point, the longest increasing subsequence may be found using a startup order corresponding to each of the item groups, and the item groups that correspond to the startup orders included in the longest increasing subsequence may be selected as excluded groups. For example, when it is assumed that item groups of G1(1,2,3), G2(5,6), G3(4), and G4(7,8,9,10,11,12,13,14,15) are generated, the longest increasing subsequence (1,5,7) may be found using startup orders '1', '5', '4', and '7' of the item groups. G1(1,2,3), G2(5,6) and G4(7,8,9,10,11,12,13,14,15), which are item groups corresponding to startup orders included in the longest increasing subsequence (1,5,7) found in this way, may be selected as the excluded groups.

At this point, when the longest increasing subsequence is two or more in number, the excluded groups may be selected in consideration of the sizes of the item groups corresponding to the startup orders included in the longest increasing subsequences. For example, when it is assumed that item groups of G1(1,2,3), G2(5,6), G3(4), and G4(7,8,9,10,11,12,13,14,15) are generated, the two longest increasing subsequences of (1,5,7) and (1,4,7) may be found using startup orders '1', '5', '4', and '7' of the item groups. At this point, since the item groups that correspond to the startup orders included in the longest increasing subsequence are selected as the excluded groups, the excluded groups, which are selected using the longest increasing subsequences of (1,5,7) and (1,4,7) may be different from each other. However, since the present invention aims to provide an update value for performing tasks while imposing a smaller workload on a system at the time of item update, the value that allows more items to become exclusion targets in the update may be selected. Accordingly, the excluded groups may be selected using (1,5,7) for enabling more items to be excluded between the two longest increasing subsequences.

As described above, the most efficient currently known algorithm for selecting the longest increasing subsequence is O(n log(n)), where n is the number of the input sequences. In the present invention, since the items are grouped, the O(n log(n)) algorithm may not be used. Accordingly, a method for solving the longest increasing subsequence with dynamic programming may be used, and since actual calculation is performed only with the size and startup order of each group, it is possible to remarkably reduce the amount of calculations. For example, since the method for finding the longest increasing subsequences of item groups and selecting update groups are classified into the cases where each item group belongs to update groups or excluded groups, the calculation complexity may be O(the square of the number of groups). Since solutions that are not configured only with net increasing groups, namely, update groups, are not included in a solution set for the long increasing subsequence, actual calculation is enabled with remarkably fewer calculations than O(the square of the number of groups.

At this time, the update groups may be selected by excluding the excluded groups from the item groups. At the time of updating caused by the change in the exposure ranking of items included in the item list, the system may be smoothly driven by minimizing the system workload attributable to the update. Accordingly, only remaining item groups obtained by excluding the excluded groups, which are selected using the longest increasing subsequence from among the item groups generated using items in the item list, may be selected as update items for updating. For example, when update orders using startup orders of item groups is 1-5-2-3-4, item groups that have startup orders corresponding to update orders of 1-2-3-4, which is the longest increasing subsequence in the update order, may be selected as the excluded groups. Accordingly, only an item group corresponding to a remaining update order 5 may be selected as update group.

At this point, the update may be performed only on the update items that correspond to the update groups. For example, when it is assumed that there are 5 items having exposure rankings from first to fifth ranks, the ranking of the item that ranks fifth may be changed to the first rank according to the change in exposure ranking. When an existing update method is used, the item that ranks fifth is updated to the first rank and the rankings of items corresponding to the first to fourth ranks are updated by 1, which requires a total of 5 updates. However, since it is likely that a large load will be placed on a system when the number of items is large, this update method is not suitable for a store that provides a large number of content items. Accordingly, through the longest increasing subsequence, items corresponding to the first to fourth ranks may be selected as excluded items to be excluded from the update task. In addition, since only the item in the fifth rank, which remains by excluding the excluded items from among the items, is selected and updated, the system workload may be remarkably reduced.

At this point, update items may be updated in consideration of multiple sorting indexes of items that have a difference in update order of 1 from the update items. The primary index of the multiple sorting indexes may be the first sorting index, and an auxiliary index thereof may be a second sorting index. For example, when primary and auxiliary indexes of each item are represented in a type of (x, y) in the order, it may be assumed that there are 5 items of A(1,0), B(2,0), C(3,0), D(4,0), and E(5,0). At this point, when the item 'E' is changed to be ranked behind the item 'A' in the update orders, multiple sorting indexes of the item 'E' may be updated to either E(2,−1) or E(1,1). E(2, −1) may be an update type of the multiple sorting indexes corresponding to the case where the item 'B', which is ranked behind the item 'E', is considered in the update orders. In addition, E(1, 1) may be an update type of the multiple sorting indexes corresponding to the case where the item 'A', which is ranked ahead of the item 'E', is considered in the update orders.

At this point, when the primary indexes of items that have a difference in update order of 1 from the update items are identical, the update items may be updated by changing the auxiliary index of any one of the items that have a difference in update order by 1 from the update items. For example, when it is assumed that there are 3 items, namely A(1,0), B(1,1), and C(2,0), and the item 'C' is changed to be ranked behind the item 'A' in the update orders, it may be difficult to sort items only by updating multiple sorting indexes of the item 'C'. This is because the auxiliary index of the item C may not be set as an integer value between '0' and '1', since the primary indexes of the items 'A' and 'B' are identical and the auxiliary indexes thereof are respectively '0' and '1'. Accordingly, the auxiliary index of the item 'B' may be updated therewith, as in A(1,0), C(1,1), and B(1,1). Alternatively, item sorting may be performed by updating the auxiliary index of the item 'A' therewith, as in A(1,−1), C(1,0), and B(1,1).

At this point, the update items may be updated in consideration of the number of items of which primary indexes are identical to the items that have differences in update order of 1 from the update items. For example, when it is assumed that there are 5 items, namely A(1,−1), B(1,0), C(1,1), D(2,0), and E(3,0), and the item 'E' is changed to be ranked behind the item 'A' in the update orders, the multiple sorting indexes of the item 'E' may be updated to either E(1, 2) or D(2, −1). When the multiple sorting indexes are updated to a type of E(1, 2), the item sorting may be performed using the auxiliary indexes of the 4 items 'A', 'B', 'C', and 'D', of which the primary indexes are identical. However, when the multiple sorting indexes are updated to a type of E(2,−1), since item sorting may be performed using auxiliary indexes of the items 'E' and 'D', of which primary indexes are identical, the system workload for updating may be further reduced. Accordingly, when the number of items of which primary indexes are identical is considered, the system workload may be reduced by updating multiple sorting indexes of a part where the number of items of which primary indexes are identical is smaller.

The item sorting unit 1240 may perform item sorting on items on the basis of update. As the update items are updated, the item sorting may also be performed in order to update the item list to be exposed to the users in the server.

At this point, item sorting may be performed using multiple sorting indexes. Generally, a single sorting index may be used in order to update or sort an item list of content provided to users in a store that provides the item list as described herein or various kinds of content. However, it may require a very complex calculation process to update items and content of which exposure rankings are frequently changed and to sort an item list with a single sorting index. Accordingly, since multiple sorting indexes, i.e. two or more indexes, are used in the present invention, an item or piece of content may be more efficiently updated in an environment in which the exposure ranking thereof is frequently changed. For example, an SQL SELECT statement may perform sorting with "order by C1, C2, . . . , Cn" using n sorting indexes from C1 to Cn. The item sorting may be performed using a first sorting index C1, and then may be performed step by step using C2, C3, . . . , Cn. In addition, the update may be performed based only on the value of C2, which is the second sorting index, without updating the value of C1, which is the first sorting index.

At this point, for items of which primary indexes of the multiple sorting indexes are identical among the items, the item sorting may be performed using auxiliary indexes of the multiple sorting indexes. The primary index may be a first sorting index, and the auxiliary index may be a second sorting index of the multiple sorting indexes. For example, when the primary and auxiliary indexes of each item are represented in a type of (x, y) in the order, it may be assumed that there are 5 items, namely A(1,0), B(2,0), C(3,0), D(4,0), and E(5,0). When the item 'E' is ranked behind the item 'A' in the update orders, the multiple sorting indexes of the item 'E' may be updated to a type of E(2, 0) in consideration of the primary index of the item 'A'. However, in this case, since the updated sorting index of the item 'E' is identical to the item B(2,0), an error may occur in the system at the time of item sorting. Accordingly, the item sorting may be smoothly performed in the system by using the auxiliary index as the type of E(2, −1).

The item database 1250 may store information on the items included in the item list. In addition, item database 1250 may also store information on the items updated by the item updating unit 1230 and information on the item list sorted by the item sorting unit 1040.

When multiple items are updated at one time by using multiple sorting indexes, the system workload attributable to item update may be reduced by searching to provide a value for a case where the update workload may be reduced to a minimum.

Figure 13:
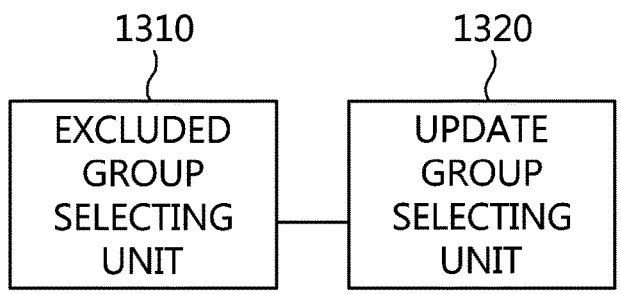
FIG. 13 is a block diagram illustrating an example of the item updating unit of FIG. 12.

FIG. 13 is a block diagram illustrating an example of the item updating unit of FIG. 12.

Referring FIG. 13, the item updating unit 1230 illustrated in FIG. 12 may include an excluded group selecting unit 1310 and an update group selecting unit 1320.

The excluded group selecting unit 1310 may select the excluded groups that correspond to the longest increasing subsequence among the item groups. The longest increasing subsequence may be used for finding values for the case where the update workload to be processed in a system may be reduced to a minimum. The longest increasing subsequence is the longest subsequence among value-increasing subsequences, and is the subsequence having the longest length when numbers are selected in ascending order. Accordingly, items for minimizing the system workload may be selected by excluding items corresponding to the longest increasing subsequence, which corresponds to sequentially increasing numbers, from update targets. For example, when 5 items have update orders of 1-4-2-3-5, the longest increasing subsequence in the update orders may be 1-2-3-5, which has update orders of 4 items as a sequence. In addition, items that correspond to update orders corresponding to 1-2-3-5, which is the longest increasing subsequence, may be selected as the excluded items.

By means of the longest increasing subsequence, it is possible to update an item list that is configured only with items in a predetermined category in correspondence with a change in the exposure ranking in an item list where items in various categories co-exist. For example, it is assumed that there is an item list 'A' where items in categories of "games," "life," "language", and the like co-exist. When the exposure ranking of a game item 'a' included in the item list 'A' is changed, the exposure ranking of the game item 'a' may also be updated in an item list 'B,' which is configured only with items corresponding to the games category.

In addition, the most efficient currently known algorithm, with which the calculation complexity of the longest increasing subsequence is obtained, is O(n log(n)), where n denotes the number of input sequences, namely, the number of items. For example, when 1024 items are included in an item list, the calculation complexity for sorting items to be updated through the longest increasing subsequence in a corresponding item list may be about O(10000).

However, when the calculation complexity of the longest increasing subsequence is calculated through the item groups in which items are grouped, the calculation complexity may be a value of O(the square of the number of groups). For example, when 4 item groups are generated by grouping 1024 items included in an item list and the calculation complexity of the longest increasing subsequence is calculated through the item groups, the calculation complexity may be O(16), which is O(the square of the number of groups). In this way, since only update items may be selected with remarkably fewer calculations, the system workload may be reduced by grouping items and performing item sorting.

At this point, the longest increasing subsequence may be found using a startup order corresponding to each of the item groups, and item groups that correspond to the startup orders included in the longest increasing subsequence may be selected as excluded groups. For example, when it is assumed that item groups of G1(1,2,3), G2(5,6) G3(4), and G4(7,8,9,10,11,12,13,14,15), are generated, the longest increasing subsequence (1,5,7) may be found using startup orders '1', '5', '4', and '7' of the item groups. G1(1,2,3), G2(5,6) and G4(7,8,9,10,11,12,13,14,15), which are item groups corresponding to the startup orders included in the longest increasing subsequence (1,5,7) found in this way, may be selected as excluded groups.

At this point, when the number of longest increasing subsequences is two or more, the excluded groups may selected in consideration of group sizes of the item groups corresponding to the startup orders included in the longest increasing subsequences. For example, when it is assumed that item groups of G1(1,2,3), G2(5,6), G3(4), and G4(7,8,9,10,11,12,13,14,15) are generated, two longest increasing subsequences of (1,5,7) and (1,4,7), may be found using startup orders '1', '5', '4', and '7' of the item groups. At this point, since the item groups, which correspond the startup orders included in the longest increasing subsequence, are selected is the excluded groups, the excluded groups, which are selected using the longest increasing subsequences of (1,5,7) and (1,4,7), may be different from each other. However, since the present invention aims to provide an update value for performing tasks with a smaller workload in a system at the time of item update, a value for allowing more items to become exclusion targets may be selected in the update. Accordingly, the excluded groups may be selected using (1,5,7) for enabling more items to be excluded between the two longest increasing subsequences.

As described above, the most efficient currently known algorithm for selecting the longest increasing subsequence is O(n log(n)), where n is the number of the input sequences. In the present invention, since the items are grouped, the O(n log(n)) algorithm may be not be used. Accordingly, a method for determining the longest increasing subsequence with dynamic programming may be used, and since actual calculation is performed based only on the size and startup order of each group, it is possible to remarkably reduce the number of calculations. For example, since the method for finding the longest increasing subsequences of item groups and selecting update groups is classified into the case where each item group belongs to the update groups or excluded groups, the calculation complexity may be O(the square of the number of groups). Since solutions that are not configured only with net increasing groups, namely, update groups, are not included in the solution set for the long increasing subsequence, the actual calculation is enabled with remarkably fewer calculations than O(the square of the number of groups).

The update group selecting unit 1320 may select the update groups by excluding the excluded groups from the item groups. At the time of updating, due to the change in the exposure ranking of items included in the item list, a system may be smoothly driven by reducing the system workload attributable to the update to a minimum. Accordingly, only remaining item groups obtained by excluding the excluded groups, which are selected using the longest increasing subsequence from among the item groups generated using items in an item list, may be selected as update items for updating. For example, when update orders, which use startup orders of item groups, are 1-5-2-3-4, item groups that have the startup orders corresponding to update orders of 1-2-3-4, which is the longest increasing subsequence in the update orders, may be selected as the excluded groups. Accordingly, only an item group corresponding to the remaining update order of 5 may be selected as an update group.

An item sorting method using the longest increasing subsequence according to the present invention may be implemented in the form of a program instruction executable by various computer means and recorded on a computer-readable storage medium. The computer-readable storage medium may include program instructions of the medium may be designed and configured specifically for the present invention, or may be a type known and readily available to those skilled in the computer software field. Examples of the computer-readable storage medium include a magnetic medium including a hard disk, floppy disk, and magnetic tape, an optical recording medium such as a CD-ROM and DVD, a magneto-optical medium such as a floptical disk, and a hardware device particularly configured to store and execute the program instructions such as ROM, RAM, and flash memory. A program instruction may include high-level language code executable by a computer using an interpreter in addition to machine code created by a computer. The hardware device may be configured to operate as at least one software module to perform an operation of various embodiments and vice versa.

In the item sorting apparatus and method using longest increasing subsequence as described above, the configuration and the method of the above-mentioned exemplary embodiments are not restrictively applied. That is, all or some of the respective exemplary embodiments may be selectively combined with each other so that they may be variously modified.

INDUSTRIAL APPLICABILITY

According to the present invention, item sorting may be performed by selecting excluded items, which correspond to a longest increasing subsequence, from among items included in an item list, selecting items for update by excluding the excluded items, and updating the update items. Furthermore, not only can the cost for managing a system be reduced by reducing the system load without upgrading hardware, tasks can also be processed in a more enabling environment at the time of performing separate system tasks.

The invention claimed is:

1. A method for updating stored information, comprising:
   identifying, with a processor, an item list including a plurality of items, the plurality of items ranked in the item list according to a first ranking, each of the plurality of items in the first ranking associated with a plurality of index values comprising a primary index value and a secondary index value;
   changing, with the processor, a ranking of the plurality of items in the item list from the first ranking to a second ranking that is different from the first ranking;
   selecting, with processor, excluded items from among the plurality of items in the item list with the second ranking, the excluded items having rankings in the second ranking that correspond to a longest increasing subsequence within the second ranking, wherein the longest increasing sequence is a longest sequence among value increasing subsequences of rankings within the second ranking of the plurality of items in the item list and is a subsequence having a longest length when rankings are selected in ascending order;

selecting, with the processor, at least one remaining item of the plurality of items in the item list other than the excluded items as an update item; and updating the primary index value and the secondary index value for the update item based on the second ranking without updating the primary index values and the secondary index values for the excluded items, wherein the secondary index value for the update item is updated responsive to the primary index value for the update item matching the primary index value for an item adjacent to the update item in the second ranking, and wherein the secondary index value is updated in consideration of the items having a difference in ranking of 1 in the second ranking.

2. The method of claim 1, further comprising:

generating, with the processor, item groups by grouping adjacent items in the item list;

selecting, with the processor, excluded groups, which correspond to the longest increasing subsequence of item from among the item groups; and selecting, with the processor, update groups by excluding the excluded groups from the item groups, updating the primary index values and the secondary index values of the update groups.

3. The method of claim 2, wherein generating item groups comprises grouping items having an increase in ranking of 1 therebetween among the plurality of items in the item list.

4. The method of claim 3, wherein the primary index values and the secondary index values of the excluded groups are not updated.

5. The method of claim 4, wherein selecting excluded items comprises selecting, as the excluded items, items of which rankings are comprised in the longest increasing subsequence from among the items, and selecting excluded groups comprises finding the longest increasing subsequence using startup orders respectively corresponding to the item groups, and selecting, as the excluded groups, item groups corresponding to the startup orders comprised in the longest increasing subsequence.

6. The method of claim 5, wherein selecting excluded groups comprises, when the longest increasing subsequence is two or more in number, selecting the excluded groups in consideration of sizes of the item groups corresponding to the startup orders comprised in the longest increasing subsequences.

7. The method of claim 1, wherein the updated primary index values and the updated secondary index values are changed according to the second ranking.

8. An apparatus comprising:

memory; and a processor configured to execute instructions stored in the memory and to:

receive an item list from a server, the item list including a plurality of items, the plurality of items ranked in the item list according to a first ranking, each of the plurality of items in the first ranking associated with a plurality of index values comprising a primary index value and a secondary index value;

changing with the processor, a ranking of the plurality of items in the item list from the first ranking to a second ranking that is different from the first ranking;

selecting, with the processor, excluded items from among the plurality of items in the item list with the second ranking, the excluded items having rankings in the second ranking that correspond to a longest increasing subsequence within the second ranking, wherein the longest increasing sequence is a longest sequence among value increasing subsequences of rankings within the second ranking of the plurality of items in the item list and is a subsequence having a longest length when rankings are selected in ascending order;

selecting, with the processor, at least one remaining item of the plurality of items in the item list other than the excluded items as an update item; and updating the primary index value and the secondary index value for the update item based on the second ranking without updating the primary index values and the secondary index values for the excluded items, wherein the secondary index value for the update item is updated responsive to the primary index value for the update item matching the primary index value for an item adjacent to the update item in the second ranking, and wherein the secondary index value is updated in consideration of the items having a difference in ranking of 1 in the second ranking.

9. The apparatus of claim 8, wherein the processor is further configured to:

generate item groups by grouping adjacent items in the list;

select excluded groups, which correspond to the longest increasing subsequence, from among the item groups; and select update groups by excluding the excluded groups from the item groups, wherein the processor is configured to update the primary index values and the secondary index values of the update groups among the items.

10. The apparatus of claim 9, wherein the processor is configured to group items having an increase in ranking of 1 therebetween among the plurality of items in the item list.

11. The apparatus of claim 10, wherein:

the processor is configured to select, as the excluded items, items having rankings in the second ranking comprised in the longest increasing subsequence from among the items, and the processor is configured to find the longest increasing subsequence by using startup orders respectively corresponding to the item groups and to select, as the excluded groups, item groups corresponding to the startup orders comprised in the longest increasing subsequence.

12. The apparatus of claim 11, wherein the updated primary index values and the updated secondary index values are changed according to the second ranking.

* * * * *